US011817938B2

(12) United States Patent
Rohde et al.

(10) Patent No.: US 11,817,938 B2
(45) Date of Patent: Nov. 14, 2023

(54) NETWORK SYNCHRONIZATION OF A BEAM-HOPPING SATELLITE SYSTEM

(71) Applicants: Fraunhofer-Gesellschaft zur Förderung der angewandten Forschung e.V., Munich (DE); Work Microwave GmbH, Holzkirchen (DE)

(72) Inventors: Christian Rohde, Erlangen (DE); Rainer Wansch, Erlangen (DE); Gerhard Mocker, Neubiberg (DE); Achim Trutschel-Stefan, Miesbach (DE)

(73) Assignees: FRAUNHOFER-GESELLSCHAFT ZUR FORDERUNG DER ANGEWANDTEN FORSCHUNG E.V., Munich (DE); WORK MICROWAVE GMBH, Holzkirchen (DE)

( * ) Notice: Subject to any disclaimer, the term of this patent is extended or adjusted under 35 U.S.C. 154(b) by 144 days.

(21) Appl. No.: 17/181,306

(22) Filed: Feb. 22, 2021

(65) Prior Publication Data
US 2021/0175966 A1    Jun. 10, 2021

Related U.S. Application Data

(63) Continuation of application No. PCT/EP2019/073691, filed on Sep. 5, 2019.

(30) Foreign Application Priority Data

Sep. 6, 2018   (DE) .................... 10 2018 215 194.6

(51) Int. Cl.
*H04B 7/212*   (2006.01)

(52) U.S. Cl.
CPC ................. *H04B 7/2125* (2013.01)

(58) Field of Classification Search
None
See application file for complete search history.

(56) References Cited

U.S. PATENT DOCUMENTS 6,975,600 B1 * 12/2005 Vaughan ............... H04B 7/212
                                                    370/321
2020/0084736 A1 * 3/2020 Regunathan ......... H04B 7/0695

FOREIGN PATENT DOCUMENTS

DE    112018006020 T5    9/2020
EP       3358759 A1      8/2018
(Continued)

OTHER PUBLICATIONS

Airbus Defence and Space-Eric Alberty et al, "System synchronization for beam hopping in multi-beam atellite networks", Jul. 1, 2017 (Jul. 1, 2017), vol. 639, No. 50, p. 560, XP007145712 (Year: 2017).*

(Continued)

*Primary Examiner* — Shripal K Khajuria
(74) *Attorney, Agent, or Firm* — McClure, Qualey & Rodack, LLP

(57) ABSTRACT

An embodiment provides a method for synchronizing a plurality of super frames to a beam switching time plan defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam; wherein each super frame comprises a data frame to be forwarded by the satellite to the respective service area.

31 Claims, 26 Drawing Sheets

(56) References Cited

FOREIGN PATENT DOCUMENTS

| EP | 3579458 B1 | 9/2020 |
|---|---|---|
| EP | 3780416 A1 | 2/2021 |

OTHER PUBLICATIONS

ESA Invitation-to-Tender, Letter of Invitation: "Beam hopping emulator for satellite systems", Artes 5.1, Activity Reference 3A.072: AO8265-li00pe.pdf (Apr. 30, 2015).

ESA Invitation-to-Tender, Statement of Work: "Beam hopping emulator for satellite systems", Artes 5.1, Activity Reference 3A.072: AO8265-ws00pe.pdf.

ESA Invitation-to-Tender, Contract: "Beam hopping emulator for satellite systems", Artes 5.1, Activity Reference 3A.072: AO8265-cc00pe.

ESA Invitation-to-Tender, Special Conditions of Tender: "Beam hopping emulator for satellite systems", Artes 5.1, Activity Reference 3A.072: AO8265-tc00pe.pdf.

ETSI EN 302 307-1, v1.4.1 (Nov. 2014), Digital Video Broadcasting (DVB); Second generation framing structure, channel coding and modulation systems for Broadcasting, Interactive Services, News Gathering and other broadband satellite applications; Part 1: DVB-S2.

ETSI EN 302 307-2, v1.1.1 (Oct. 2014), Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X).

DVB-S2 user guidelines: ETSI TR 102 376, V1.1.1 (Feb. 2005): Digital Video Broadcasting (DVB); User guidelines for the second generation system for Broadcasting, Interactive Services, News Gathering and other broadband satellite applications (DVB-S2).

ETSI TR 102 376-2 V1.1.1 (Nov. 2015), Digital Video Broadcasting (DVB); Implementation guidelines for the second generation system for Broadcasting, Interactive Services, News Gathering and other broadband satellite applications; Part 2: S2 Extensions (DVB-S2X).

Fraunhofer IIS, Fraunhofer HHI, Work Microwave, Newtec, DLR, IZT GmbH, "Direct to Home System Demonstrator for High Throughput Multimedia Applications", ESA research project, contract No. 4000103596/11/NL/AD (May 2, 2016).

Fraunhofer IIS, Work Microwave, Avanti Communications: Ultra-High Throughput Transmission Through Wideband Ka Transponder, ESA research project, contract No. 4000110170/14/NL/EM (Nov. 10, 2017).

C. Rohde, H. Stadali, J. Perez-Trufero, S. Watts, N. Alagha, and R. De Gaudenzi, "Implementation of DVB-S2X Super-Frame Format 4 for Wideband Transmission," 7th EAI International Conference on Wireless and Satellite Systems (WISATS), Jul. 2015, Bradford, United Kingdom.

Digital Video Broadcasting (DVB), White Paper on the use of DVB-S2X for DTH applications, DSNG & Professional Services, Broadband Interactive Services and VL-SNR applications. DVB Document A172 (2015).

C. Rohde, N. Alagha, R. De Gaudenzi, H. Stadali, G. Mocker, Super-Framing: A Powerful Physical Layer Frame Structure for Next Generation Satellite Broadband Systems, Int. Journal of Satellite Communications and Networking (IJSCN), Wiley Press, vol. 34, No. 3, pp. 413-438, Nov. 2015, sAT-15-0037.R1. Available: http://dx.doi.org/10.1002/sat.1153.

European Space Agency, "Wide-band Direct to Home (WiDiHo)" information available at: http://artes.esa.int/projects/wide-band-direct-home-widiho-itt6613.

Christian Rohde et al., "Beam-hopping systems for next-generation satellite communication systems", Chapter 10 of "Satellite Communications in the 5G Era" Edited by Shree Krishna Sharma, Symeon Chatzinotas and Pantelis-Daniel Arapoglou, Institution of Engineering and Technology, 2018.

Airbus Defence and Space-Eric Alberty et al, "System synchronization for beam hopping in multi-beam satellite networks", Jul. 1, 2017 (Jul. 1, 2017), vol. 639, No. 50, p. 560, XP007145712.

International Search Report dated Nov. 14, 2019 issued in PCT/EP2019/073691.

\* cited by examiner

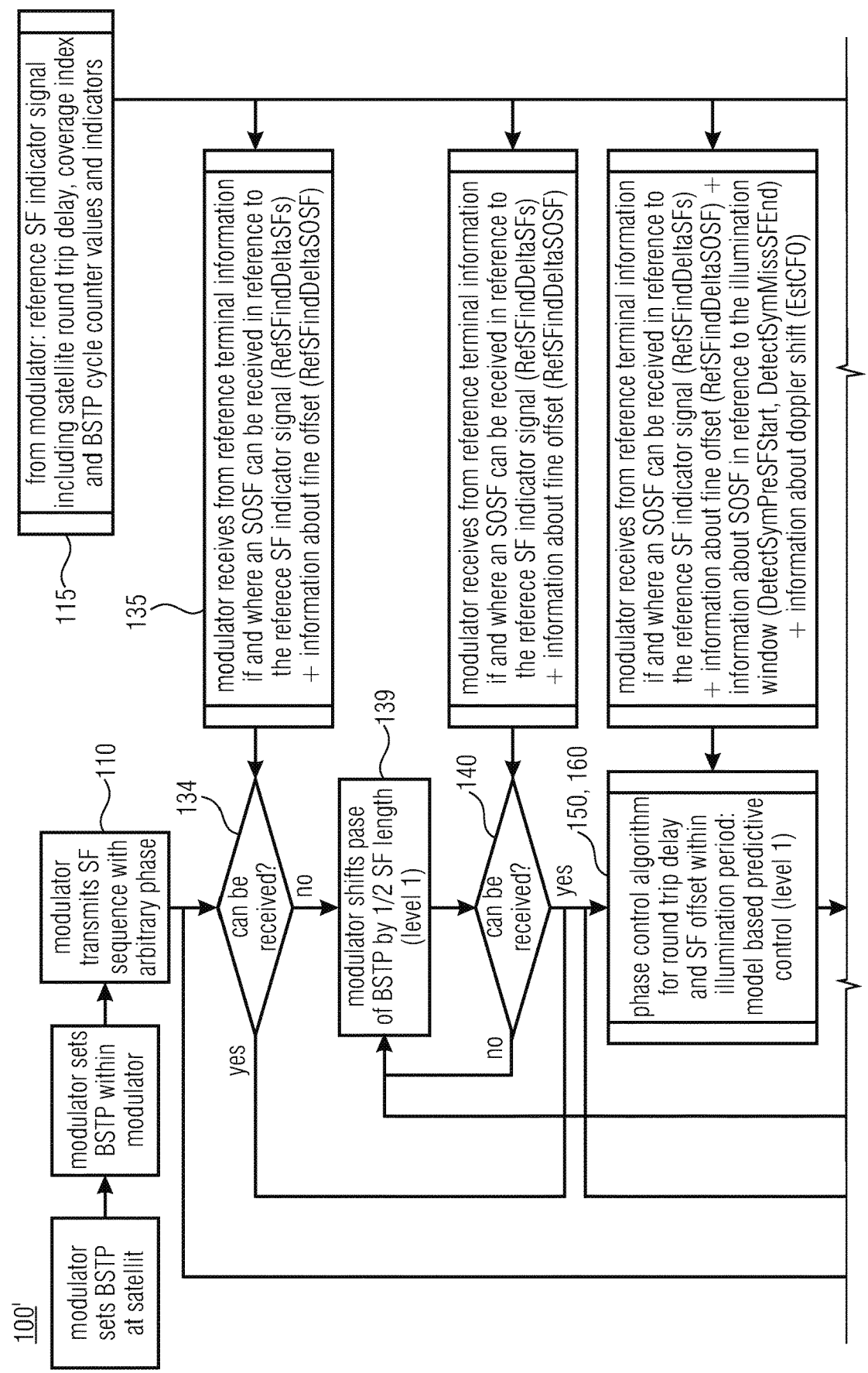
Fig. 6d (Part 1)

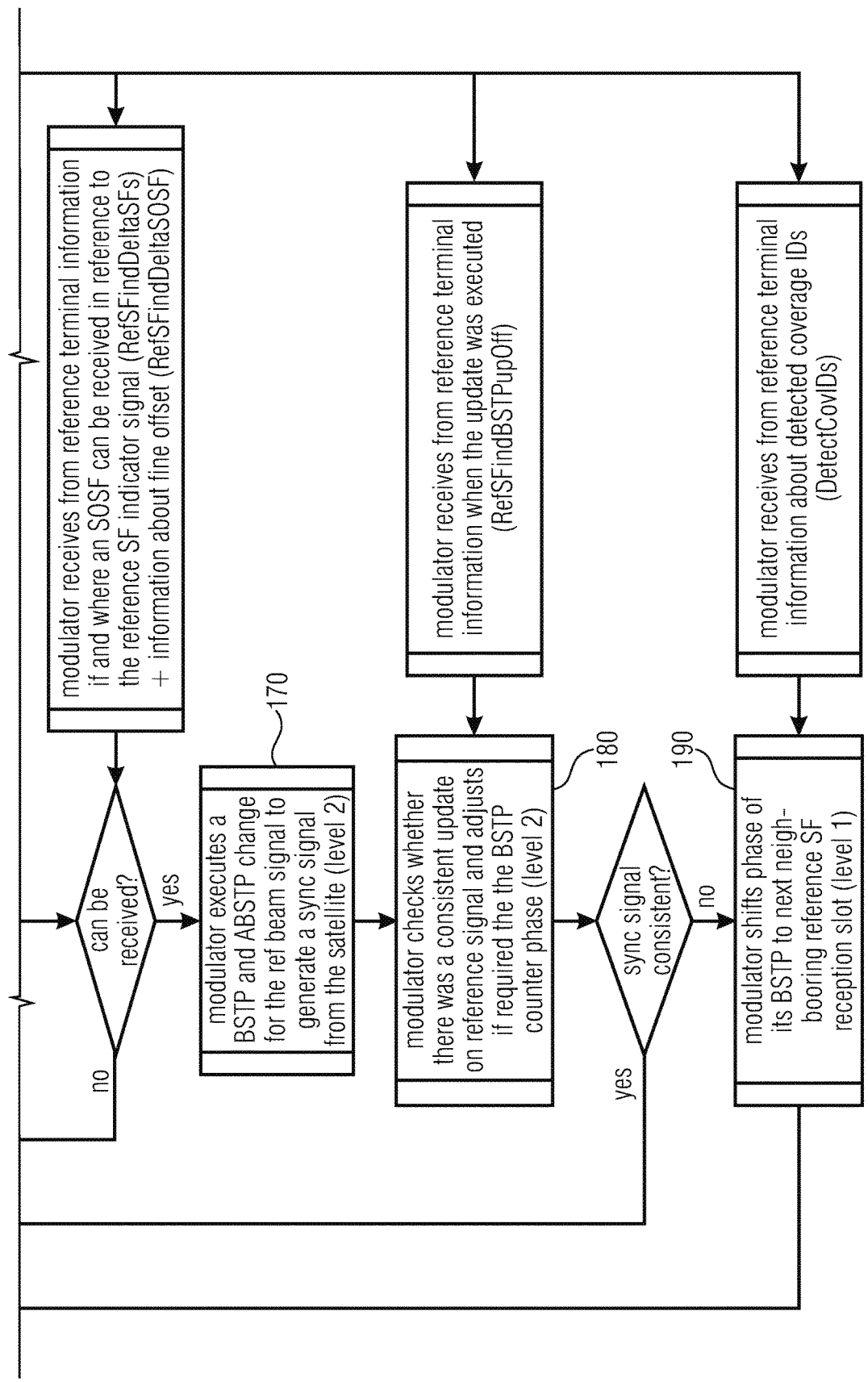
Fig. 6d (Part 2)

| parameter | modulator | payload | payload simulator | reference and user terminal |
|---|---|---|---|---|
| if center frequency (between 950-2150 MHz) | yes (including upconversion for real payload) | yes (payload is transparent but adds frequency conversion) | no (simulator is transparent without frequency conversion) | yes (including downconversion for real payload) |
| nominal symbol rate | yes | yes | yes | yes |
| scrambling pattern | yes | no (payload is transparent) | no (simulator is transparent) | yes |
| BSTP | yes | yes | yes | no (signalling undefined, knowledge not considered crucial) |
| BSW length | yes | yes | yes | no (signalling undefined, knowledge not considered crucial) |

Fig. 7a

NETWORK SYNCHRONIZATION OF A BEAM-HOPPING SATELLITE SYSTEM

CROSS-REFERENCES TO RELATED APPLICATIONS

This application is a continuation of copending International Application No. PCT/EP2019/073691, filed Sep. 5, 2019, which is incorporated herein by reference in its entirety, and additionally claims priority from German Application No. DE 10 2018 215 194.6, filed Sep. 6, 2018, which is incorporated herein by reference in Its entirety.

BACKGROUND OF THE INVENTION

Embodiments of the present invention refer to a method for synchronizing a plurality of super frames to a beam-switching time plan. Further embodiments refer to a corresponding controller, to a modulator comprising a controller and to a reference terminal comprising a controller. Another embodiment refers to a system, e.g. a beam-hopping satellite system having improved network synchronization mechanisms based on a control loop for signals synchronization with satellite-switching events.

Beam-hopping satellite systems have the aim to enable a faster and more flexible communication. Instead of a static illumination, the satellite cycles in time through a set of coverage areas according to a so-called beam-switching time plan so as to enable to adapt the system to changing traffic demands over time and location.

In detail: The traffic demands can be satisfied at a given time, when only one or a certain number coverage of the complete set is active with increased/full power and increased/full bandwidth and, thus, allowing to share a capacity between a limited number of spots. The beam-hopping/capacity sharing is performed in a time variable manner (i.e. in the time domain). The activation of the different beams is defined by the beam-switching time plan which can directly be applied by the beam hopping satellite (here, the beam-hopping is controlled from the ground terminal). To enable, that the respective data frames for the respective coverage/service areas are transmitted (completely) using the scheduled beam, the transmission of the data frames from the modulator (ground station) to the satellite has to be synchronized with the beam-switching time plan (whereby the beam switching time plan itself is made known to the satellite and the modulator in parallel by means not explained and covered here).

BACKGROUND OF THE INVENTION

An embodiment may have a method for synchronizing a plurality of super frames to a beam switching time plan defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam; wherein each super frame comprises a data frame to be forwarded by the satellite to the respective service area; the method having the steps of: transmitting at least a one of the plurality of super frames to the satellite as reference super frame, using a modulator; applying the beam switching time plan and forwarding—using the satellite—the reference super frame to a reference terminal within a one of the plurality of dwell times; receiving, using the reference terminal, the one of the plurality of dwell times; determining a known sequence of the reference super frame within the one of the plurality of dwell times; and determining a time difference between transmitting the reference super frame and receiving the one of the dwell times or receiving of the reference super frame or determining a time period being directly dependent on the time difference between transmitting the reference super frame and receiving the one of the dwell times or receiving of the reference super frame.

Another embodiment may have a non-transitory digital storage medium having a computer program stored thereon to perform the method for synchronizing a plurality of super frames to a beam switching time plan defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam; wherein each super frame comprises a data frame to be forwarded by the satellite to the respective service area; the method having the steps of: transmitting at least a one of the plurality of super frames to the satellite as reference super frame, using a modulator; applying the beam switching time plan and forwarding—using the satellite—the reference super frame to a reference terminal within a one of the plurality of dwell times; receiving, using the reference terminal, the one of the plurality of dwell times; determining a known sequence of the reference super frame within the one of the plurality of dwell times; and determining a time difference between transmitting the reference super frame and receiving the one of the dwell times or receiving of the reference super frame or determining a time period being directly dependent on the time difference between transmitting the reference super frame and receiving the one of the dwelt times or receiving of the reference super frame, when said computer program is run by a computer.

Another embodiment may have a controller for synchronizing a plurality of super frames to a beam switching time plan defining plurality of dwell times, the beam switching time plan scheduling a switching between at least two beams which are transmitted using a high-altitude platform or a satellite, wherein each beam covers a respective service area so as to forward a respective data frame to the respective service area using the respective beam; wherein each super frame comprises a data frame to be forwarded to the satellite to a respective service area, wherein the controller is configured: to control a modulator such that same transmits at least one of the plurality of super frames to the satellite as reference super frame and to apply the beam switching time plan to the satellite such that the satellite forwards the reference super frame to the reference terminal within one of the plurality of dwell times to a reference terminal; and to control the reference terminal such that same receives the one of the plurality of dwell times and determines a known sequence of the reference super frame within the one of the plurality of dwell times; and to determine a time difference between receiving the one of the dwell times or receiving the reference super frame and transmitting of the reference super frame or to determine a time period being directly dependent on the time difference between transmitting the reference super frame and receiving the one of the dwell times or receiving of the reference super frame.

Another embodiment may have a system comprising the inventive controller, a modulator and a reference terminal.

An embodiment of the present invention provides a method for synchronizing a plurality of super frames to a beam-switching time plan (BSTP) defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam: wherein each super frame comprises a data frame to be forwarded by the satellite to the respective service area. The method comprises the following steps:

- transmitting at least one of the plurality of super frames to the satellite as reference super frame, using the modulator. Here, it should be noted that the reference super frame can be used for carrying user data as the other super frames, wherein the reference super frame is the one exploited for network synchronization. Furthermore; It should be noted that a plurality of reference super frames can be used for the synchronization process, e.g., when a plurality of durations of the synchronization process are performed;
- applying the beam switching time plan and forwarding—using the satellite—the reference super frame to the reference terminal within a one of the plurality of dwell times;
- receiving, using a reference terminal, the one of the plurality of dwell times;
- determining a known sequence of the reference super frame within the one of the plurality of dwell times;
- determining a time difference between transmitting the reference super frame and receiving the one of the dwell times or receiving of the reference super frame or a time period being directly dependent on the time difference between transmitting the reference super frame and receiving the one of the dwell times or receiving of the reference super frame.

Embodiments of the present invention are based on the principle that the analysis of a reference super frame received from a satellite with respect to the transmission of same to the satellite enables a good measurement base for synchronizing a beam-switching time plan for a beam-hopping satellite to the super frames including the data packets. The comparison between the real and the expected travel time of the reference signal allows a conclusion onto the mismatch of the synchronicity so that the transmission can be rescheduled with respect to the BSTP or vice versa, afterwards. This means from the hardware's point of view that a control loop for the signal synchronization is formed, wherein the control loop mechanism consists of a modulator (or a central unit controlling several modulators), a beam-hopping satellite, and at least one reference terminal. The reference terminal does various offset measurements based on the received satellite signal exploiting the signal structure and a specifically designed reference signal, which is directly transmitted from the modulator to the reference terminal and carries an information regarding the transmission of the reference super frame to the satellite. When the reference terminal receives the respective reference super frame from the satellite, a coarse synchronization is indicated, since the right reference super frame is delivered using the right reference beam. The determination of a time difference enables to find out the real travel time of the signal, such that a fine synchronization can be performed. The result is that the entire data transmission is synchronized with the beam-switching events so that, as consequence, no user data frames are corrupted by a switching event and are present in the correct beam coverage for the target user.

According to further embodiments, the offset measurement values are transmitted via an efficient feedback protocol from the reference terminal to a control unit, e.g. the control unit of the modulator. According to the feedback, the control unit performs different adaption schemes and strategies (fine, coarse, updating a switching schedule, etc.).

According to embodiments, the method further comprises transmitting a reference super frame indicator signal to the reference terminal, wherein the reference super frame indicator signal indicates a transmission begin, a transmission window and/or a transmission end of the reference super frame.

The usage of a separate digital reference signal from the modulator to the reference terminal can be used for instantaneous comparison and relation to the received signal from the satellite. Since the reference signal is delayed with the nominal trip delay of the common signal transmission over the satellite, it allows for identification of the correct received beams. Background thereof is that (a) there is some probability to receive more than one beam at the reference terminal location and (b) resolve the time ambiguity which received signal both corresponds to which transmission of the modulator. For example, the reference signal has an active and an inactive state. It is active (e.g. high) during the expected illumination duration and inactive (e.g. low/mute) otherwise. Thus, the reference signal indicator may—according to embodiments—comprise the method of transmitting a reference signal indicating an expected receipt, an expected receipt begins, an expected receipt window and/or an expected receipt end of the one of the dwell times to the reference terminal. In this case the method may, for example, comprise determining an updated time difference between the receipt and the expected receipt, and adapting the transmission of the plurality of super frames or of the beam switching time plan based on the updated time difference.

For example, the separate digital reference signal is initially delayed by the modulator according to the nominal trip delay between the modulator and the reference terminal. Further on this delay is adjusted with a quasi-continuous measurement and control process to the slowly varying real trip delay of the satellite in between the modulator and the reference terminal. Further, it allows the identification of the correct reference signal portion of the transmitted signal by the reference terminal and serves as reference for various relative time measurements:

1. With an evaluation of the time difference of correlation peak for the start-of-super-frame (SOSF) sequence (or other preamble pattern known to the receiver) at the reference terminal with the rising edge of the reference signal the exact trip delay and trip delay change can be evaluated. Changes of the latency between ground and satellite can be derived from this.
2. The BSTP of the satellite is known to the Modulator, only the point in time when the BSTP starts over again at the satellite is a priori not known by the modulator. The modulator can based on feedback from the reference terminal adjust the time phase of the sent BSTP to the BSTP applied by the satellite and can also fine adjust the symbol clock frequency of the modulator to the clock frequency of the satellite, including also doppler shift effects, caused by movement of the satellite.

Precise measurements on the current situation can be executed with this signal used as measurement reference. Delay in the complete loop and on the return message forwarding is less critical using this signal if a special control algorithm, as e.g. a Kalman type control algorithm, is used. The Reference Terminal can do time difference measurements between start/end of reference signal and start/end of illumination (power detection) and occurrence of known/identifiable sequence in the RF signal. (Note that also the BSTP duration can be estimated from both signals and compared, ->Measured times (differential or absolute if common time base) are fed back to modulator for compensation of the offsets (Immediate or stepwise). Expressed in general words this means that the method comprises— according to embodiments—determining the time difference is performed so as to determine the time difference between the receipt of the one of the dwell times or of the known sequence of the reference super frame and the super frame indicator signal.

According to embodiments the method comprises measuring frequency offset values corresponding to the doppler shift of a symbol rate or carrier frequency of the received reference super frame. Based on the measured frequency offset the symbol clock rate of the modulator can be adapted. The use of measured values for doppler shifts on the carrier dock and carrier frequency improves the delay measurements or enables replacing delay measurements.

The method further comprises adapting the transmission of the plurality of super frames with regard to a point of time of the transmission based on the determined time difference in order to synchronize the plurality of super frames to the beam switching plan. For example, adapting the transmission of the plurality of super frames with regard to a point of time of the transmission is based on the determined time difference by shifting the transmission by a number of super frames and adapting a trip delay by an determined offset, wherein the number is defined by integer multiples of a fix super frame length within the time difference and wherein the offset is calculated using the subtraction of the integer multiples from the determined time difference. Alternatively, the method comprises the step of adapting the beam switching time plan based on the determined time difference in order to synchronize the plurality of super frames to the beam switching plan.

According to embodiments, within the method the transmission of the at least a one of the plurality of super frames is performed taking into account a trip delay for delaying the transmission the plurality of super frames with respect to the beam switching time plan. Here, the method comprises the step of adapting the trip delay based on the determined time difference in order to synchronize the plurality of super frames to the beam switching plan. Alternatively, the transmission is performed using a trip delay for delaying the transmission the plurality of super frames with respect to the beam switching time plan, wherein the method further comprises the step of transmitting a reference super frame indicator signal to the reference terminal, the reference super frame indicator Indicating a the trip delay, and comparing the received reference super frame indicator signal with the received receipt of the one of the dwell times or of the reference super frame so as to determine the time difference. Here, the method further comprises the step of adapting the trip delay based on the determined time difference in order to synchronize the plurality of super frames to the beam switching plan. Note that the synchronization and control mechanism can do both delay or accelerate the transmission of super frames.

Here, it should be noted that the trip delay between transmission and the BSTP application at the satellite corresponds to approx. 0.5 nominal trip delay and trip de the trip delay between reference indicator signal and receipt of the dwell time/reference super frame corresponds to approx. 1.0 nominal trip delay. Furthermore, it should be noted that the adaption may be performed on the following mechanisms; adapting transmission parameters, adapting a symbol dock frequency, adapting time phase and/or skipping symbols of a data frame or skipping data frames in order to adapt or delay the transmission.

Regarding the above-mentioned mechanisms for adapting, it should be noted that according to further embodiments, the trip delay is taken into account when a trip delay is calculated using a so-called modulo calculation of the time difference. For example, the modulo of calculation on a duration of the super frames enables to determine how many super frames by use of a beam-switching time interval has to be shifted by the modulator. According to embodiments, the modulo calculation based on constant length super frames allows also to immediately calculate the real trip delay based on any found super frame, as long as the uncertainty of the real trip delay is shorter than the length of the super frame.

Another option for the detectable event is to use adapting a beam forming configuration defining an association of beams and service areas or an affiliation configuration signal defining from which beam assigned to a respective service area a reference beam to the reference terminal is spotted to enable the generation of a split beam used to forward the reference super frame to the reference terminal or to enable to generate a dedicated beam used to forward the reference super frame to the reference terminal.

According to embodiments, the adapting is performed so as to correct an trip delay offset and BSTP delay in reference to the illumination window or dwell time by one step. This means that a combination of trip delay offset correction and BSTP delay correction in reference to the illumination window in one control step is used. Initial (acquition phase) and continued fine correction (tracking phase) implemented as the same algorithm. According to embodiments the adapting is performed so as to correct trip delay based on measured trip delay correction values and to adapt the BSTP transmission delay based on known physical similarities (i.e. using measured trip delay correction values also to adapt the BSTP transmission delay based on known physical similarities). According to embodiments, the adapting is performed so as to correct the BSTP delay using measured BSTP delay correction values and to adapt the trip delay based on known physical similarities (i.e. using the measured BSTP delay corrections to also adapt the trip delay values within the control loop due to known physical similarities).

It should be noted that these may advantageously be performed during an initial calibration phase, i.e. before switching into the normal operation phase, wherein the same or quite comparable synchronization mechanisms may be used during the normal operation phase. Optionally, the methods may be performed after updating the beam-switching time plan. Here, the step of receiving is performed for a further of the plurality of dwell times while the step of determining the known sequence is performed for the further reference super frame within the further one of the plurality of dwell times and while the step of determining the time difference is performed for a time difference between receiving the further one of the dwell times or receiving the further reference super frame and transmitting the further reference super frame.

According to further embodiments, the following method may be performed during the normal operation phase: The method comprises causing a detectable transmission event using the modulator, wherein the step of receiving is performed for a further of the plurality of dwell times being influenced by the detectable transmission event and wherein the step of determining the time difference is performed by determining a time difference between receiving the detectable transmission event and receiving corresponding known sequence of super frame as reference super frame. Therefore, this is referred to as data-aided mode.

In case that time difference is determined between receiving the detectable transmission event and receiving corresponding to change in power envelope detection (e.g. change in power level or a slope detection etc.), this is referred to as non-data-aided mode.

Here, the detectable transmission event may be an update of a split beam affiliation. The split beam affiliation enables to define another beam from which is assigned to a respective service area a reference beam to the reference terminal is split. The changing of the split beam affiliation to the main beam helps to avoid the above-discussed power drop (e.g. 5 dB) for verifying correct SP synchronisation without disturbing the user beams. This split beam is generated, e.g. first timely related with main beam 2, then with main beam 3. The change of the position in time can be used as indicator for a switchover, without a power drop. Furthermore, the change of the split beam affiliation enables to verify the synchronicity by avoiding ambiguity of a detection by the reference terminal, in case of a BSTP update During the normal operation, the synchronicity may—according to embodiments—be maintained by iteratively performing one of the above methods and/or may be verified as follows: the method comprises varying a parameter for the transmission of the reference super frame in order to verify the synchronicity or in order to mark a further one of the dwell times as dwell time for forwarding a further reference super frame. From another point of view that means that a reference super frame may be marked as reference super frame using the identification information. This enables to use a regular super frame as reference super frame.

If during the (normal) operation, the known sequence could not be found the step of determining the known sequence is—according to embodiments—performed by shifting the transmission of a further one of the plurality of super frames as further reference super frame by a fragment of the super frame period or a half of the super frame period in order to enable to determine the known sequence of reference super frame.

Additional verification approaches for monitoring the synchronicity may be used: The reference signal and/or the reference super frame indicator signal includes an identification information on the coverage area, and wherein determining the known sequence of the reference super frame includes the verification of the matching of the identification Information regarding the coverage area between the transmitted and the received reference super frame. For example, the reference terminal detects/decodes coverage ID from the reference signal and from the RF signal so as to output a feedback of the decoding results and/or comparison results. This helps on the detection that the received signal is the reference portion of the transmitted signal. Note that multiple SFs can be received with different coverage IDs signaled in the RF-signal of a not yet synchronized network. So instead of spending lot of feedback bits for all possibly received IDs, it is more efficient to feedback only FIRST decoded ID and for how many SFs it stays present. This represents precise information about a potential signal shift in multiples of SFs.

Alternatively, the method comprises the step of counting the number or determined reference super frames (BSTP counter/count up or down until next expected Sync Pulse (=Potential BSTP update) and signaling also of "last BSTP Counter cycle" before BSTP Update and "first BSTP Counter cycle" after BSTP plan update so that the terminal can report on the counter offset; this enables that the modulator can correct its assumptions). According to another embodiment, the method comprises resetting a counter when detecting reference signal and incrementing the counter with each super frame. For example, signal a zero for detected SP event via the feedback message and then increment this feedback variable with each message/illumination. This assures that the SP event information can be determined from each message, which helps if some messages got lost.

The counter approach may also be used in combination with split beam affiliation: Testing the synchronicity of the BSTP cycle counter in the satellite with the BSTP cycle counter in the modulator with the method "Change split beam affiliation" or "temporary drop of the signal power, e.g. by 5 dB drop tor e.g. one complete BSTP counter cycle) allows to check whether the signal received by the reference terminal has passed through reference coverage of the satellite, if no such expected effect can be detected by the reference terminal it can be assumed that the received signal has not passed through the reference beam illumination of the satellite (but e.g. through another beam leaking into the area of the reference terminal) and a corrective action, as searching for the correct reference signal can be initiated (or an error condition can be indicated).

According to further embodiments, the method comprises analyzing a BSTP counter value signaled over the reference super frame indicator signal so as to determine a time offset as full BSTPs between the satellite update cycle and modulator update cycle. Note the BSTP counter value is signaled over the reference super frame indicator signal to the reference terminal and immediately allows defection of the value of time offset as full BSTPs between the satellite update cycle and modulator update cycle.

Additionally, the reference super frame and/or the reference signal is encoded or protected or comprises a redundancy information. Protection is evaluated by the reference terminal to verify correctness of reference signal and/or identify and correct reception errors. Reference terminal may also feedback the error rate or permanent/regular/frequent verification errors to the modulator.

Another alternative is to determine a time difference between the known sequence and the begin of the dwell time to verify the synchronicity. For example, measuring the difference between power detect start of illumination to the first set of super frame detection enables to verify the synchronicity and to maintain the synchronicity, without a reference signal. Here, the respective super frame can be identified using the coverage ID. In other word this means that another indicator that the alignment of BSTP cycle of modulator is correct can be concluded if the illumination duration of the reference beam is unique compared to the other beams and if this is detected clearly by the reference terminal and fed back to the modulator.

According to a further embodiment, the method wherein the reference super frame comprises feedback data message or an information for generating the feedback data message (enabling an efficient/robust Feedback protocol from reference terminal to modulator.) For example, each received reference signal (or alternatively reception of predefined coverage ID within the signal header, e.g. ST field, index of walsh hadamard matrix) induces generation of feedback data message. In order to save overhead (due to IP-headers, feedback channel resource allocation etc.) for feedback transmission, it is possible to group several feedback messages (each referring to a different received reference signal) into a big feedback data frame. In such a frame, signaling of the amount of present messages is included (=Length indicator). Only one transmit time stamp per feedback data frame and not per each feedback message. Include data of current reference signal into feedback message. This eases identification of sync scenario/status for delayed or non-real-time processing at the modulator.

According to further embodiments, the method comprises determining a change rate of the time difference, by comparing at least two determined time differences; or the method comprises determining a change rate of the time difference, by comparing at least two determined time differences and updating a trip delay based on the change rate. This means for example, to allow precise evaluation of symbol clock and carrier frequency changes by the reference terminal, compared to the modulator, the reference clock of the reference terminal is locked to the modulator reference clock by a separate physical reference clock signal connection. Use of the evaluation of BSTP duration of the received satellite signal can be used in a similar way as doppler shift evaluation on the symbol clock and carrier frequency (as received by the reference terminal) to identify trip delay changes. The delay and the delay changes between the modulator and the satellite relate to trip delay and round-trip delay changes between the modulator and the reference terminal, so that these round-trip delay changes can be used for enhancing the control algorithm to effects with higher fluctuation caused by the satellite movement, compared to slower quasi static clock offsets between satellite and the ground equipment. Here extrapolating the (stored) data can be performed.

The method may according to embodiments comprises the step of forecasting a change rate of the time difference using predetermine data; or the method comprises the step of forecasting a change rate of the time difference using predetermined data and updating a trip delay based on the change rate. In other words, this means that the adaption may be performed on historic data, e.g. regarding the satellite movement (position correction data) over a certain time period, e.g. 24 hours. This data can be received externally and help to maintain (by extrapolating) the synchronicity, e.g. in case of s breakdown of the reference terminal. By usage of predetermined data (a priori knowledge) enables to improve the initial calibration phase, since an assumption on the projected trip delay can be taken.

Furthermore, this a priori knowledge enables to identify ambiguity of the received signals. The background thereof is that the a priori knowledge may define a maximum of the variation of the trip delays. This holds true, especially, when a fixed super frame length is used.

According to an embodiment, the method performs the step of transmitting initially by using a predetermined trip delay in order to minimize the difference between the receipt of the one of the dwell times or the receipt of the reference super frame and a transmission of the reference super frame.

According to an embodiment, a method wherein each of the plurality of super frames has the same length or wherein each of the plurality of super frames transmitted using the same beam switching time plan (BSTP) has the same length can be used. The usage of a fixed super frame length or a predetermined length enables that a large offset can be compensated via the super frame resource allocation, i.e., mapping the data to other super frames, so that the modulator can skip entire super frames for correcting the delay. The symbol rate is then just used for fine adaption.

The above described methods may be performed using a computer. Thus, each method may be implemented as program code. A further embodiment provides a computer program including the program code.

Vice versa, the above described principle may be implemented in a hardware. Therefore, an embodiment provides a controller, namely a controller for synchronizing a plurality of super frames to a beam switching time plan defining plurality of dwell times, the beam switching time plan scheduling a switching between at least two beams which are transmitted using a high-altitude platform or a satellite, wherein each beam covers a respective service area so as to forward a respective data frame to the respective service area using the respective beam; wherein each super frame comprises a data frame to be forwarded to the satellite to a respective service area. The controller is configured to control a modulator such that same transmits at least one of the plurality of super frames to the satellite as reference super frame and to apply the beam switching time plan to the satellite such that the satellite forwards the reference super frame to the reference terminal within one of the plurality of dwell times to a reference terminal; and to control the reference terminal such that same receives the one of the plurality of dwell times and determines a known sequence of the reference super frame within the one of the plurality of dwell times: and to determine a time difference between receiving the one of the dwell times or receiving the reference super frame and transmitting of the reference super frame or a time period being directly dependent on the time difference between transmitting the reference super frame and receiving the one of the dwell times or receiving of the reference super frame.

The controller may, for example, be integrated into the reference terminal or integrated into the modulator. Also, a shared controller being implemented Into both entitles is possible. According to further embodiments, the controller is configured to control the plurality of modulators. The controller may also be used to update the beam switching time plan. Here, it may be beneficial if the controller knows the transmission requirements of the service areas. Therefore, according to an embodiment the controller is configured to analyze the traffic demands for the respective service areas and to adapt the beam switching time plan automatically based on the analysis. Furthermore, it should be noted that a controller may, according to embodiments, be used for a plurality of networks. Another embodiment provides a system comprising the controller, the modulator and the reference terminal. The system may further comprise a beam switching satellite or beam switching high amplitude platform.

According to embodiments, the system wherein the modulator and the reference terminal are driven by a common clock and/or are connected to each other by a control line and/or positioned next to each other and/or at spaced apparat from each other.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
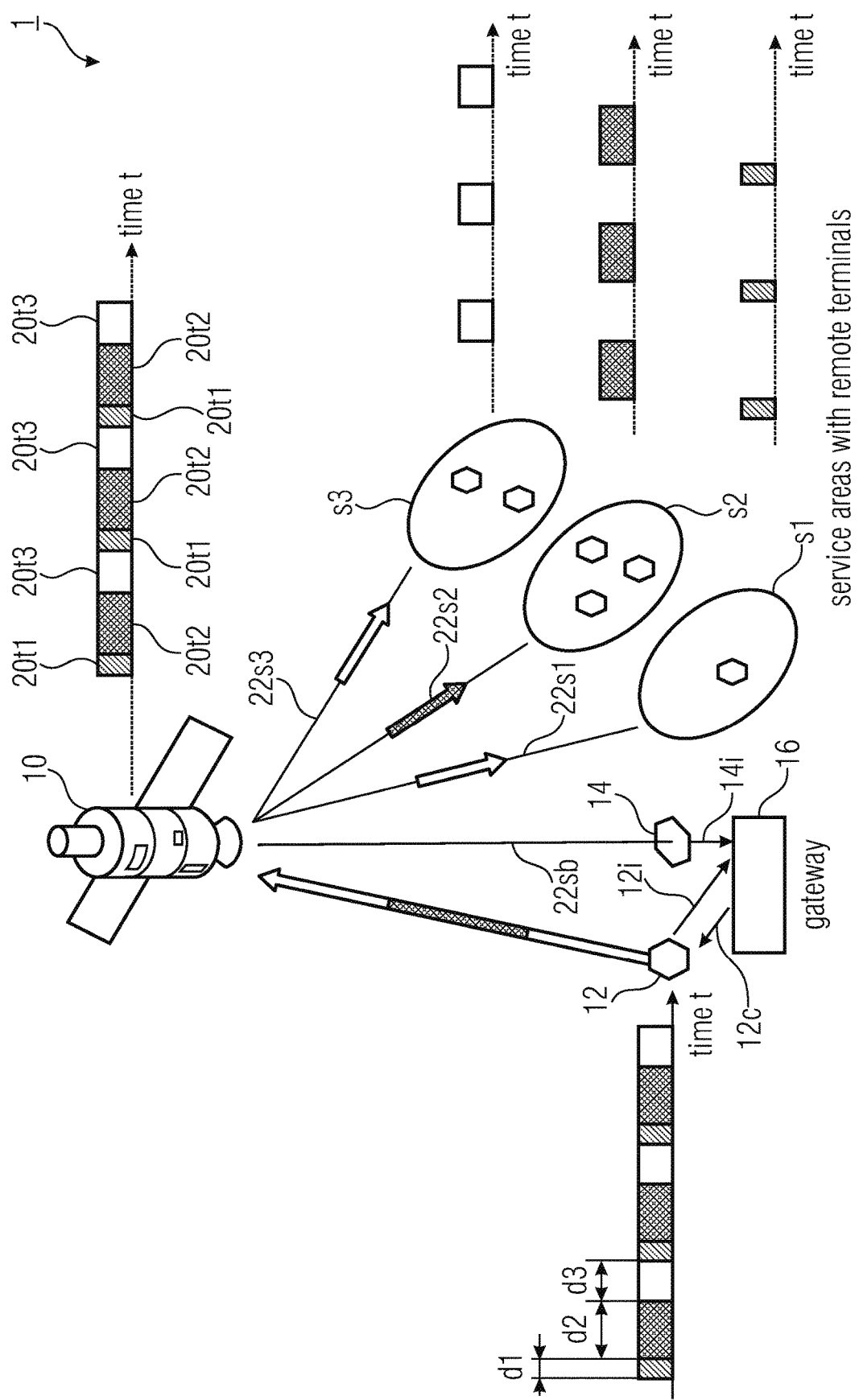
FIG. 1a shows a schematic representation of a system comprising a satellite, a modulator and a reference terminal for illustrating the concept of synchronizing a beam-hopping satellite system according to embodiments.

Below, embodiments of the present invention will subsequently be discussed referring to the enclosed figures. Here, identical reference numerals are provided to elements having identical or similar function, so the description thereof is mutually applicable and interchangeable.

FIG. 1a shows a system 1 comprising a satellite 10, a modulator 12 (e.g., a ground station), a reference terminal 14 (e.g., also realized as ground station). Both elements are advantageously, but not necessarily, arrange side by side, so that same can directly communicate with each other for exchanging status and control information and, advantageously, for using the same clock.

As illustrated by the entity 16, the modulator 12 may be controlled by a controller which is connected with the modulator 12 by use of a control channel 12c. Alternatively, the controller 16 may be integrated into the modulator 12. The controller 16 has access to the modulator 12, so that same can receive information, e.g., regarding the transmission and especially regarding the transmission timing from same (cf. information channel 121). Further the controller 16 has access to the reference terminal 14 (cf. Information channel 141). Due to this the controller can evaluate the receipt of a reference super frame with respect to the transmission of the respective super frame. According to another variant, the controller 16 may be integrated Into the reference terminal 14, so that same receives directly the information of the reference terminal 14.

Below, the functionality of the system 1 will be discussed. The beam hopping satellite 10 is configured to transmit within different dwell times t1, t2, t3 data frames to different service areas s1, s2. Here, so called hops are used, as illustrated by the reference numeral 20. In accordance with these hops 20 t1, 20 t2, 20 t2 which are defined by a so-called beam switching time plan, data frames received from the modulator 12 (by the satellite 10) are forwarded using the beams 22s1 and 22s2 to the respective service areas s1 and s2. Note, the data packets d1, d2 and do are transmitted within super frames having at least a header indicating the start of super frame and the payload.

In order to ensure that the right data packets are transmitted using the right hops 20, the modulator 12 transmits the super frames with the data streams d1, d2 and d3 in time to the satellite 10. Since there is a travel time of a signal between the modulator 12 and the satellite the modulator 12 arranges the super frames comprising the data streams d1, d2 and d3 in time with respect to the transmission windows t1, t2 and t3. In detail, the super frames/data frames d1, d2 and d3 are scheduled differently/earlier with respect to the time slots t1, t2 and t3 defined by the BSTP within the satellite 10.

The controller 16 is configured to control this scheduling. For this, the controller 16 performs an initial calibration within which it analyzes the mismatch between the dwell times and the super frames transmitted by the respective dwell times. For this one or more reference super frames/ reference data frames (comparable to the super frames/data frames d1 to d3) are used which are addressed to the reference terminal 14 such that same can analyze the reference super frames with respect to the dwell times.

In detail: For the synchronization purpose, the transmitter 10 forwards one or more reference super frames, e.g., using a spilt beam 22sb to the reference terminal 14. Within the respective dwell time, e.g., t1, the reference super frame is at least partially included so that a mismatch between the entire dwelt time and the start of super frame can be determined. This determination is advantageously performed by determining the start of super frame within the receipt signal and determining a time difference with respect to the transmission of the respective reference super frame, in order to receive the right super frame/start of super frame the controller 16 or the reference terminal 14 receives from the modulator an information regarding the transmission, e.g. the point of time of the transmission together with the expected travel time or the expected point in time of the receipt calculated based on the point in time of the transmission. Expressed from another point of view that means that the controller 16 or the reference terminal 14 knows—starting from the received transmission information approximately the point in time of the receipt of the reference super frame and can determine (identify) it. After that a measurement of the time difference between the real receipt and the expected receipt (variable directly dependent on the transmission) can be performed. The result of this measurement is the real trip delay mismatch and/or real trip delay from the modulator 12 via the satellite 10 to the reference terminal 14. Under the knowledge of the mismatch or the real trip delay, the controller 16 can adjust the point of time of the transmission of the super frames d1, d2 and d3 with respect to the beam switching time plan or, vice versa.

As indicated above, controller 16 may have access to the received reference super frame at the reference terminal 14 and to the point of time of the transmission of the reference super frame by the modulator 12. For example, the controller 16 may receive a so-called reference super frame indicator signal from the modulator 12. This signal can indicate the transmission or an expected receipt (i.e., with an expected travel time). Starting from such a reference super frame indicator signal having a high and a low state, wherein the high state is activated during the expected illumination duration it is enabled to verify the correct alignment of the super frames d1, d2 and d3 with the dwell times t1, t2 and t3. A correct alignment can be determined when the reference super frame, or the start of reference super frame (SOSF pattern) is detected at the position indicated by the reference super frame indicator.

Figure 1B:
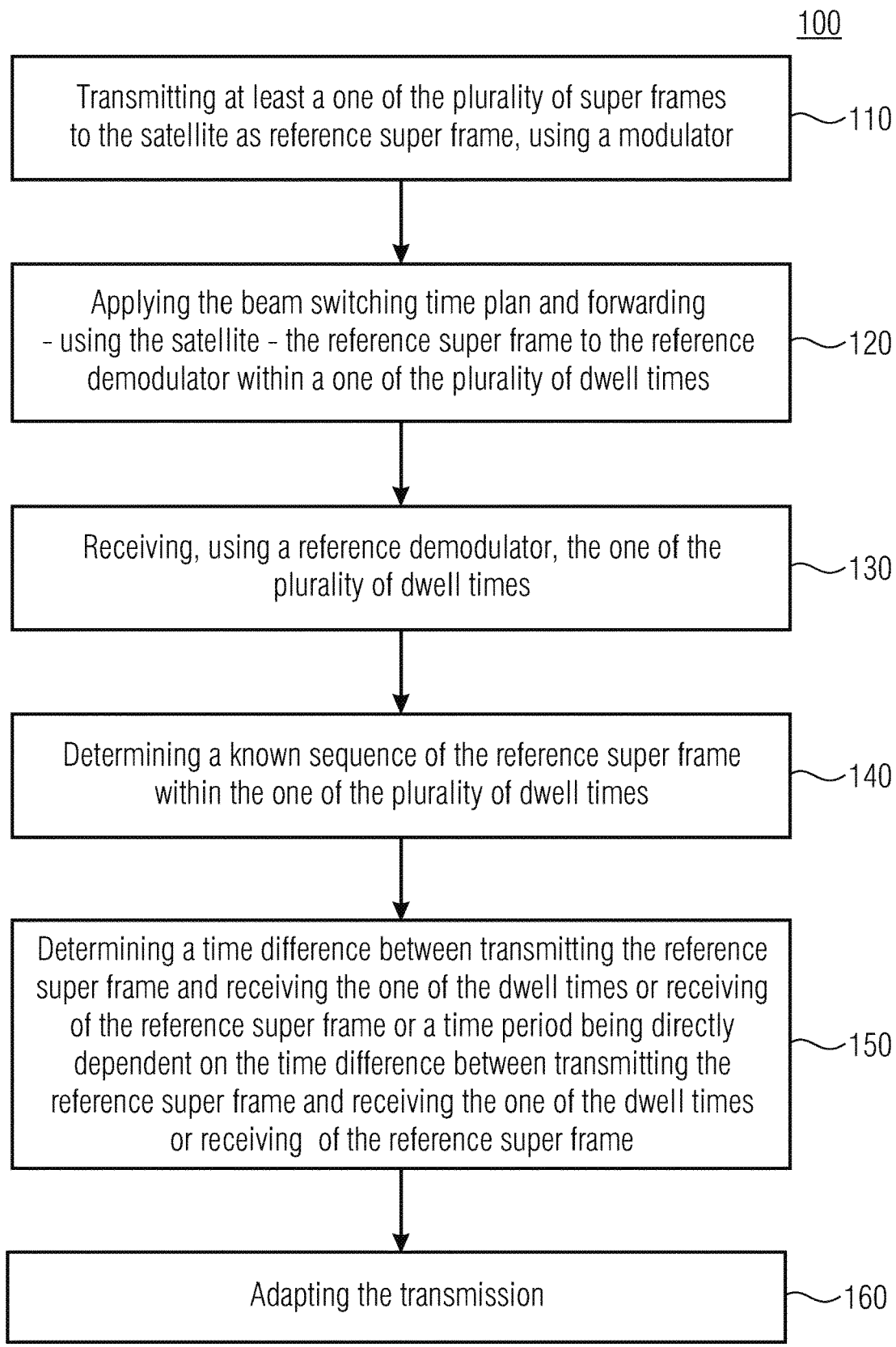
FIG. 1b shows a schematic flowchart of a method for synchronizing a beam-hopping system according to further embodiments.

The entire process for synchronizing is shown by FIG. 1b, FIG. 1b shows the method 100 having the five basic steps 110 to 150.

The first step 110 of transmitting the one or more reference super frames is performed by the modulator 12. The step of applying the beam switching time plan and forwarding the one or more reference super frames is performed by use of the satellite 10. This step is marked by reference numeral 120. The third step 130 of receiving the one or more dwell times comprising the one or more reference super frame or at least a part of the reference super frames is performed by the reference terminal 14.

Within this reference terminal 14 or the controller 16, the next two steps 140 and 150 may be performed. The step 140 refers to determining a known sequence, e.g., the start of the reference super frame, within the one dwell time. After that a time difference or a time period being directly dependent on the time difference between the transmit and the receipt of the reference super frame is determined. Such a time period may, for example, be the time difference between the indicated/expected receipt and the real receipt of the known sequence. This difference is directly dependent on the time difference between the transmit and the receipt (real travel time) and enables a good conclusion on the match or mismatch between the transmission of the super frames and the time switching plan.

Figure 1C:
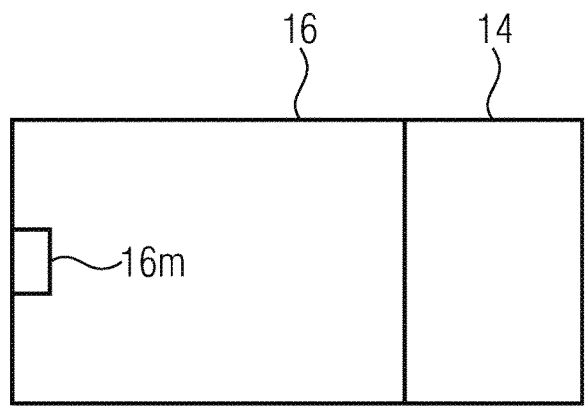
FIG. 1c shows a schematic representation of a controller for controlling a beam-hopping satellite system and especially for controlling the synchronization procedure according to a further embodiment.
Figure 4A:
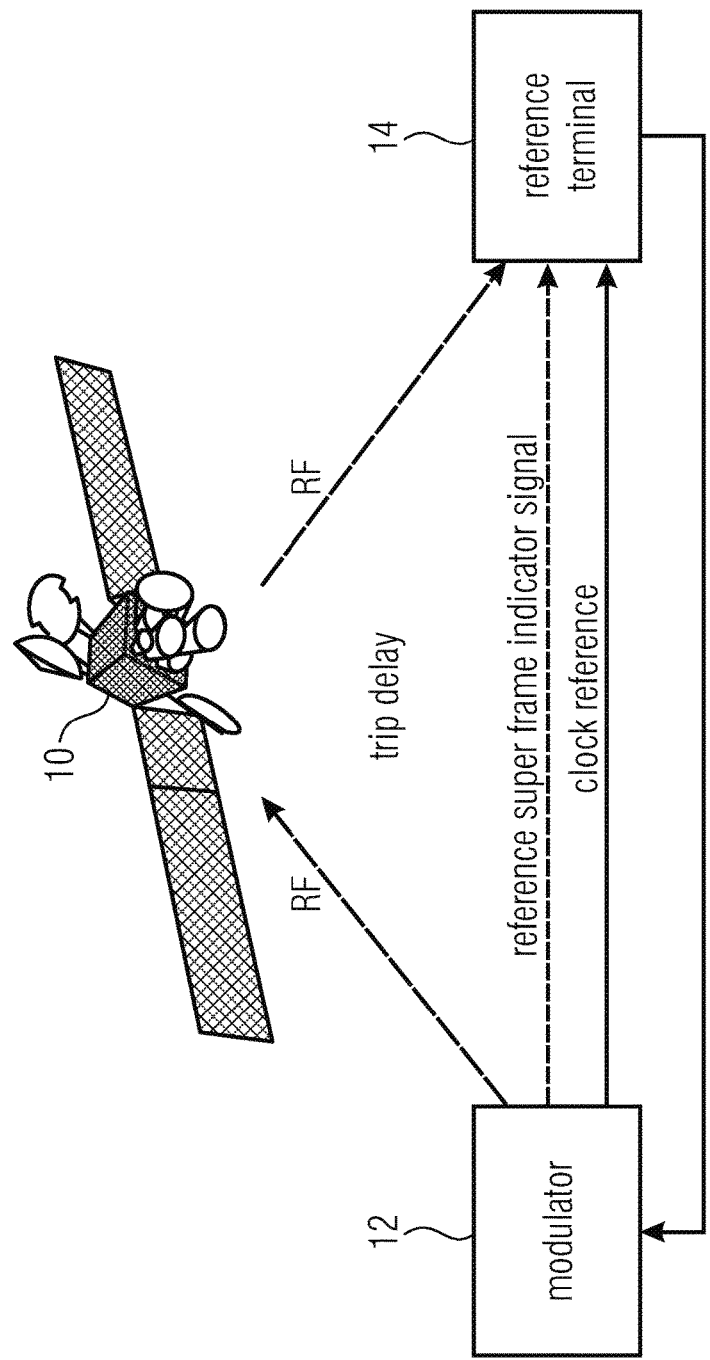
FIG. 4a shows schematic block diagram of signals and connections between modulator and reference terminal.

The method 100 may be performed by the controller 16 which can be integrated into the reference terminal 14, the modulator 12 or realized as external entity 16 as illustrated by FIG. 1c. Alternatively, the controller may be implemented as a shared controller, i.e., by at least two entities, e.g., the modulator 12 and the terminal 14 which perform the five steps 110 to 150 together. After that an optional step 160 of adapting the transmission/BSTP may be performed. Possible implementation of the adaption may be discussed with respect to FIGS. 4c and 4d, FIG. 1c shows the controller 16 which is directly connected to the reference terminal 14 so that same can get the received signal of the reference terminal 14 for determining the known sequence and for setting the point of time of receiving the known sequence in consideration to the transmission time or the reference time signal indicator. This information is received via an interface 16m to the modulator 12.

According to further embodiments, the reference terminal 14 and the controller 16 may be used for a plurality of modulators 12. Background thereof is that in a common case of running not only one but several beam-hopping networks over a satellite, one could either multiply the above-mentioned concepts or one can install a central control unit 14 plus 16, which command ail the modulators (not shown). This may be more efficient since there is one satellite to track and all of the measured off set values of the different beam-hopping networks will be highly correlated. Here, it is beneficial that the efficiency is increased.

Regarding the system up-scalability it should be noted that: in the common case of running not only one but several beam-hopping networks over a satellite, one could either multiplicate the above-mentioned concepts OR one can install a central control unit, which commands all the modulators. This may be more efficient since there is one satellite to track and all of the measured offset values of the different beam-hopping networks will be highly correlated. So, efficiency is increased.

Since it may be too costly to run for each beam-hopping network one reference terminal (and maybe a redundancy reference terminal as well), a more efficient approach is to have only a few reference terminals and to reconfigure from time to time (according to a schedule given by the central control unit) to analyze different beam-hopping networks. Here, the very high stability of the satellite clock is exploited so that conditions are static/highly predictable.

To combat unfavorable weather situations, different ground stations are commonly in use. Therefore, reference terminals can be placed at other sites so that the central control unit will receive and exploit measurement feedback from mere than one site, in consequence, data fusion and combining of the central control unit will increase robustness and QoS for the user. Note, in this case it may eventually not be possible to use a hard wired reference signal between the modulator and the reference terminal, but by measuring just the position of the super frame within the illumination and analyzing the position and change rate it will be possible to conclude also on other parameters to be adjusted (see the indicated relations in FIG. 7f)

According to further embodiments, it might be an option to use a few reference terminals (cf, reference numeral 14) In combination with one or more controllers performing the above-mentioned concept. Background thereof is that it might be too costly to run for each beam hopping network one own reference terminal (and may be a redundancy reference terminal as well). A more cost-efficient approach is to have only a few reference terminals and to reconfigure from time to time (according to a schedule given by the central control unit) to analyze different beam hooping networks. Here, the very high stability of the satellite dock is explored so that conditions are static/highly predictable. Here, it might be an option to combat unfavorable weather conditions, so that the different ground stations are commonly in use. Therefore, reference terminals can be placed at other sites so that the central control unit 16 (for plurality of beam-hopping networks) will receive a reference measurement feedback from more than one site. Consequently, the date fusion a combining of the central control unit will be increased with listeners and QoS for the user.

Before discussing the embodiments in detail, optional features of the reference terminal 14 (cf. FIG. 1a) and the satellite 10 (cf. FIG. 1a) will be discussed.

According to embodiments, the beam hopping solution assumes that the gateway and reference terminal are collocated and share a common, stable clock. It is considered within such embodiments that if the reference and gateway are not collocated the link is regarded as potentially inadequate when considering impacts of jitter and delay fluctuations. It is also assumed that there is no common time stamp between the satellite and gateway.

The reference terminal receives the forward link on a regular basis which can be through a number of methods:

Loop-back: here, the beam loops back to the reference terminal at regular intervals. However, this implies an extra loop within the hopping configuration and as such reduces the overall capacity of the system.

Split-beam: the hopping beam that covers users is spilt such that a lobe also covers the reference terminal. Via the phased array antenna, the level of the lobe can be reconfigured as necessary to maintain the link. The level of the split could degrade the minimum performance of the user beam as well as the accuracy of the reference terminals estimations.

Dedicated beam: An additional resource is assumed.

Advantageous is to use a split beam, because it seems that the degradation can be designed to be minimal, but no separate resource is required. And also moving the spilt from one main beam to another seems to be an elegant method to generate a sync pulse type signal, which indicates execution of a new BSTP in the satellite, without affecting user Beams. Also, a sync pulse type signal in the way to apply power step changes with the execution of a new BSTP can be implemented.

According to embodiments, the properties of station-keeping of the satellite have influence on the requirements of the synchronization method. As first order effect the changes on the radius of the satellite orbit have influence of the signal propagation delay in the uplink and downlink. Changes need to be compensated by the synchronization algorithms. The radius of the satellite orbit, which changes to some extend over time is described by ephemeris data of the satellite. The radius parameters are described as range parameter within these data sets. This ephemeris data, including also satellite movement over time in east-west, north-south direction is typically made available by the satellite operators, as it is required also for specific earth station antenna pointing algorithms. During maneuvers, the satellite orbit is actively corrected by operation of thrusters, in between these maneuvers the changing satellite position over time can be predicted very well for the period of several days and can be downloaded e.g. from the satellite provider. Also, historical data is available.

Figure 2A:
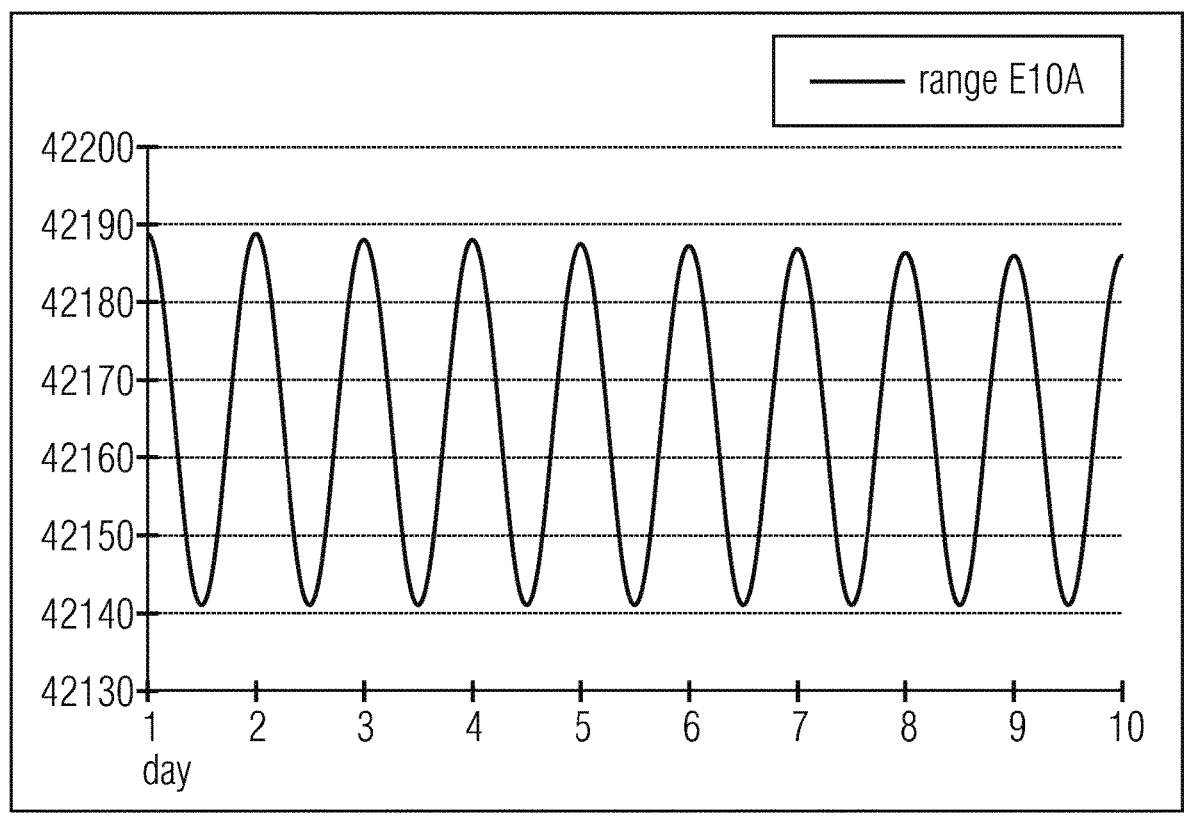
FIG. 2a, b, c show schematic diagrams of range parameter of an exemplary satellite over some example days.
Figure 2B:
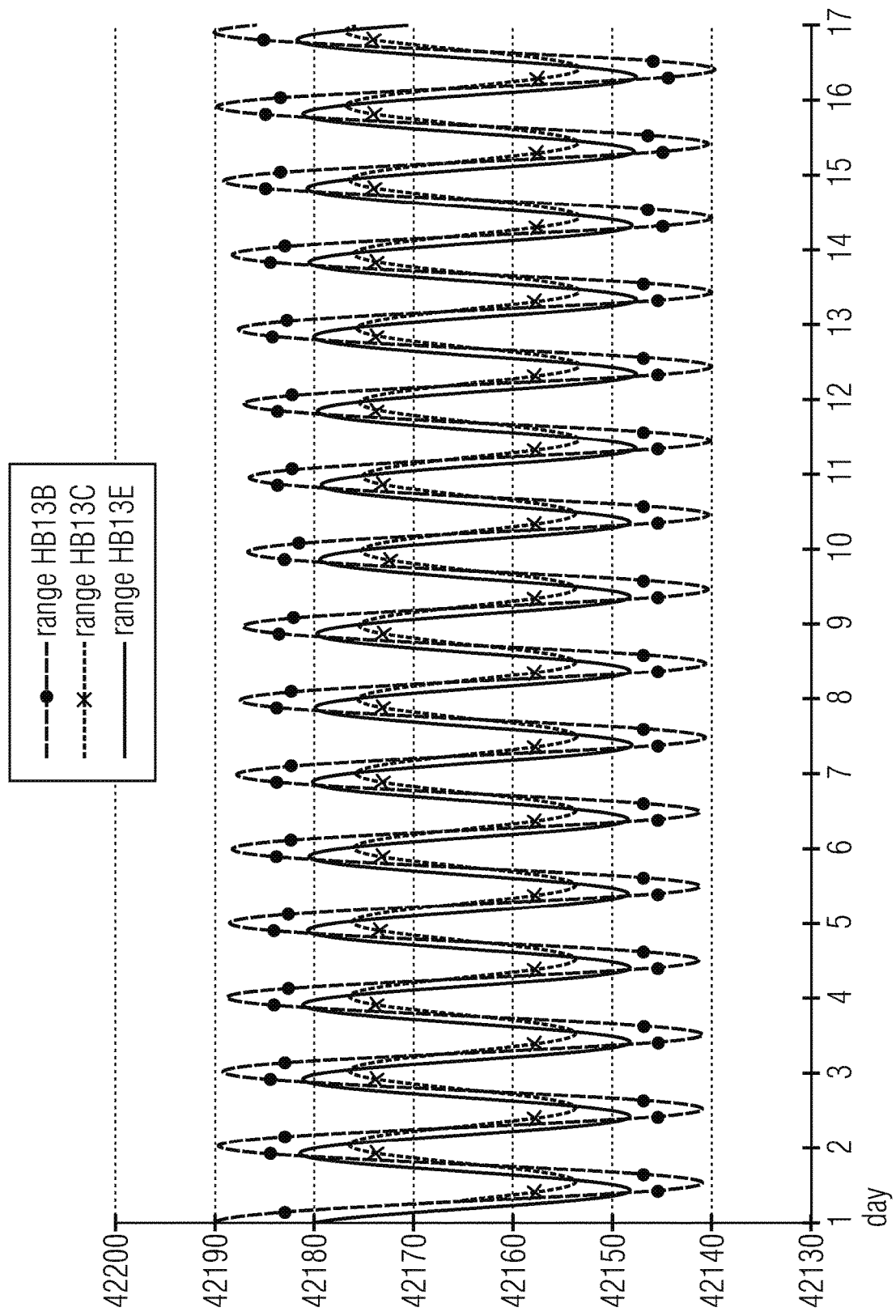
FIG. 2d shows a schematic representation of a super-frame constitution, format 4 or others.
Figure 2C:
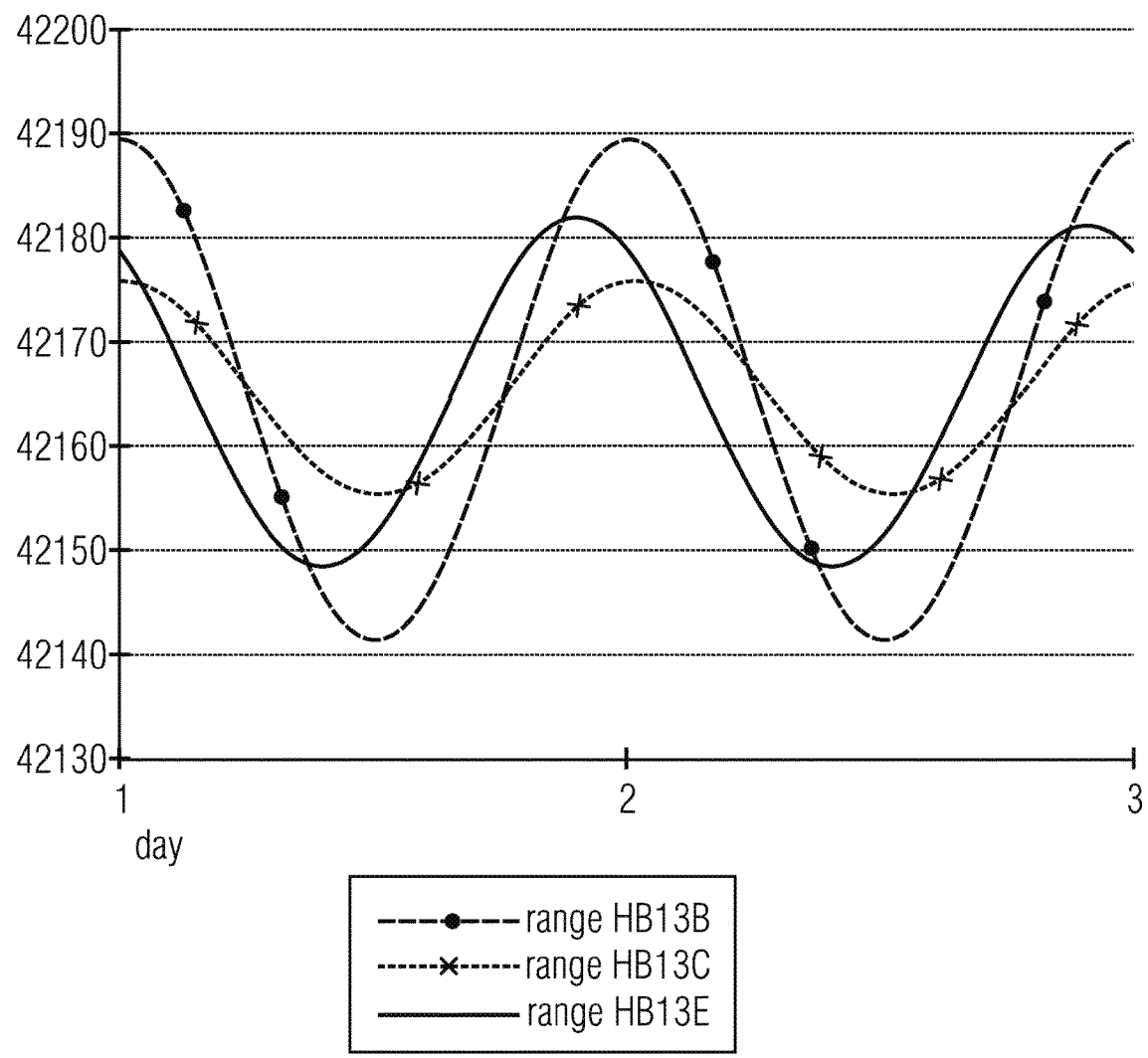

Some examples for this ephemeris data have been evaluated, where the focus was to extract the range (radius) parameter changes. FIG. 2a to FIG. 2c show some examples of the range parameter changes for some satellites. These FIGS. 2a to 2c show that the daily range value changes follow mainly a sine curve, but the amplitude of the sine may be different for each satellite and change slightly over time.

From the retrieved data it is assumed that the satellite is kept within an orbital box which has in radial direction an extension of 50 km (min extension approx. 20 km). The trip path therefore can vary by maximum 100 km, causing a time variation in trip delay of 0.33 ms. Informative: the east/west north/south box size corresponds to ±0.1°, and with a mean radius of satellite orbit of approx. 42165 km results to 147 km.

The daily variation which can be observed as maximum variation shall in the following be modelled as sine function with amplitude 25 km:

$$\text{range}(t) = 25 \text{ km} * \sin\left(2\pi \frac{1}{\text{day}} * t\right)$$

The change results as:

$$\frac{d \text{ range}(t)}{dt} = 25 \text{ km} * 2\pi \frac{1}{\text{day}} * \cos\left(2\pi \frac{1}{\text{day}} * t\right)$$

The maximum change rate is:

$$\frac{d \text{ range}(t)}{dt}\text{max} = 25 \text{ km} * 2\pi \frac{1}{\text{day}} = 25 \text{ km} * 2\pi \frac{1}{24\text{h}} = 6{,}55 \frac{\text{km}}{\text{h}} = 1{,}82 \frac{m}{s}$$

The maximum change rate of the roundtrip path is twice this value, so per hour the founding path can change at maximum by Δrange max=6.55 km*2=13.1 km.

This means that the maximum trip delay change per hear is:

$$\Delta rtd = 13{,}1 \text{ km} * \frac{1}{c} = 0{,}044 \text{ ms}$$

From this, with a symbol rate of 250 Msps, a maximum symbol offset change within the transmitted signal of 10916 symbols per hour can occur. As comparison to this the length of the SOSF is 270 symbols. If this is used for synchronization with a correlation function, and the synchronization shall track e.g. with a granularity of maximum 10% of this value (27 symbols), a tracking cycle of maximum 27/10916*3600 s=8.9 s is required.

This coarse estimation shows that for proper tracking the control cycle is active very frequently (every few seconds, to be able to keep track properly, also under worst case range change conditions).

The trip path change (maximum relative velocity of the satellite is 6.55 km/h=1.82 m/s) also creates doppler shift on the carrier frequency of transmitted signals:

In the uplink path (assuming an uplink frequency fu of 18 GHz) the maximum doppler shift can be calculated as approx. 109 Hz.

In the downlink path (assuming an downlink frequency fd of 12 GHz) the maximum doppler shift can be calculated as appr. 73 Hz.

The relation between the change rate of the round-trip delay rtd and the total doppler shift is described with the following formulas:

range: radius of satellite orbit
rtd: trip delay
Δf: Doppler shift
fu: uplink frequency
fd: downlink frequency
c 293.792.458 m/s
$\vec{evS}$: unity vector of the movement of the satellite
$\vec{eGS}$: unity vector of the direction between the ground station and the satellite $$\Delta f = fu \cdot \left(-\frac{d\,\text{range}(t)}{dt} \cdot (\overrightarrow{evS} \cdot \overrightarrow{eGS}) \cdot \frac{1}{c}\right) + \quad (1)$$
$$fd \cdot \left(-\frac{d\,\text{range}(t)}{dt} \cdot (\overrightarrow{evS} \cdot \overrightarrow{eGS}) \cdot \frac{1}{c}\right)$$

$$\frac{dtrd(t)}{dt} = \frac{d\,\text{range}(t)}{dt} \cdot (\overrightarrow{evS} \cdot \overrightarrow{eGS}) \cdot \frac{1}{c} \cdot 2 \quad (2)$$

$$\frac{dtrd(t)}{dt} \cdot \frac{1}{2} = \frac{d\,\text{range}(t)}{dt} \cdot (\overrightarrow{evS} \cdot \overrightarrow{eGS}) \cdot \frac{1}{c} \quad (3)$$

With (1) and (3):

$$\Delta f = \left(-\frac{drtd(t)}{dt} \cdot \frac{1}{2}\right) \cdot fu + \left(-\frac{drtd(t)}{dt} \cdot \frac{1}{2}\right) \cdot fd = -\frac{drtd(t)}{dt} \cdot \frac{1}{2} \cdot (fu + fd) \quad (4)$$

for fu=18 GHz, fd=12 GHz and $$\frac{\Delta rtd}{\Delta t} = 0{,}044\ \text{ms}/3600$$

s e.g. the following Δf results: Δf=183 Hz

The trip delay change results from the observed relative Doppler shift (4):

$$\frac{drtd(t)}{dt} = -\Delta f \cdot \frac{2}{fu + fd} \quad (5)$$

As the satellite runs on a constant dock rate hut the uplink symbol rate as seen by the satellite is changed due to uplink doppler shift, the modulator compensates for this by adapting its symbol rate fs in a reverse way:

Uplink path delay up path similar to (2):

$$\frac{du\,\text{path}\,t(t)}{dt} = \frac{d\,\text{range}(t)}{dt} (\overrightarrow{evS} \cdot \overrightarrow{eGS}) \cdot \frac{1}{c} \quad (6)$$

For the relative doppler shift on the symbol rate fs on the uplink path results similar to (1):

$$\Delta fus = fs \cdot \left(-\frac{d\,\text{range}(t)}{dt} \cdot (\overrightarrow{evS} \cdot \overrightarrow{eGS}) \cdot \frac{1}{c}\right)s \quad (7)$$

with (6):

$$\Delta fus = fs \cdot \left(-\frac{du\,\text{path}\,t(t)}{dt}\right) \quad (8)$$

In general and with (5):

$$\frac{du\,\text{path}\,t(t)}{dt} = \frac{drtd(t)}{dt} \cdot \frac{1}{2} = -\Delta f \cdot \frac{2}{fu + fd} \cdot \frac{1}{2} \quad (9)$$

From (8) and (9):

$$\Delta fus = \Delta f \cdot \left(\frac{fs}{fu + fd}\right) \quad (10)$$

the modulator compensates for this by changing its symbol rate Δfs, mod in a reverse way:

$$\Delta fs, \text{mod} = -\Delta fus = -\Delta f \cdot \left(\frac{fs}{fu + fd}\right) \quad (11)$$

The adapted modulator symbol rate fs; a results to:

$$fs, a = fs + \Delta fs, \text{mod} = fs - \Delta f \cdot \left(\frac{fs}{fu + fd}\right) = fs\left(1 - \frac{\Delta f}{fu + fd}\right) \quad (12)$$

(whereby fs,a and fs are still very close in their absolute value, so that they can be treated as identical for the evaluation of the doppler shift)

Including the doppler shift measurement closely into the control loop may help tracking the trip path length change and symbol offset change. This shall be implemented for a live system as well as for the simulation as inner control loop with simple proportional characteristic and therefore good dynamic behavior. An outer loop monitoring and adjusting the offset between illumination and the super frames is additionally used for initial setup and fine continuous adjustment.

With these values the above worst-case considerations need to be modified only to a minor extend, as the maximum velocity during maneuvers of 3 m/s is in range of the normal daily variation dependent worst-case velocity of 1.8 m/s (see above).

As worst-case velocity, including some margin, 4 m/s shall be considered for the control algorithm.

Figure 7B:
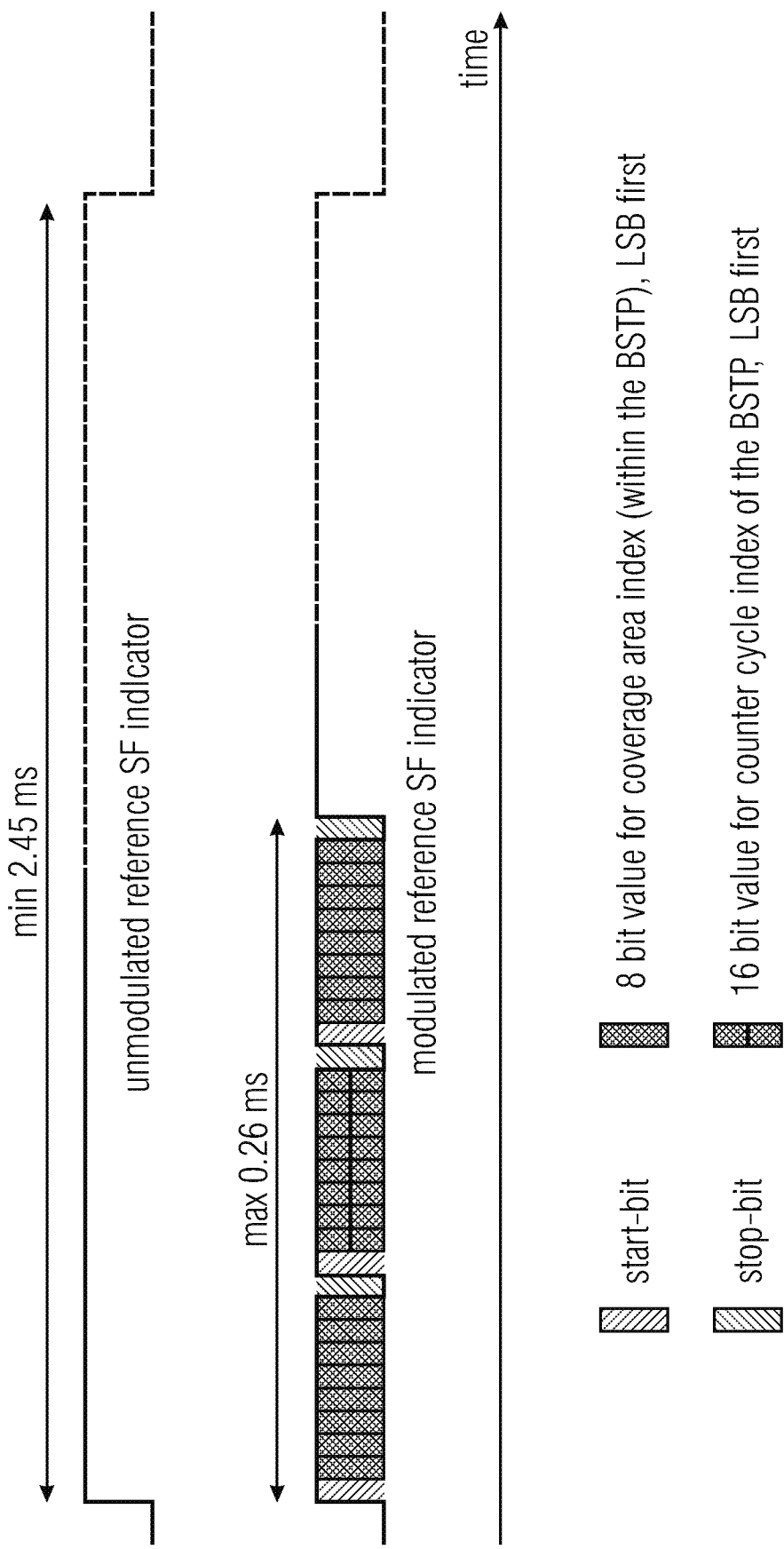
FIG. 7b Illustrates reference SF indicator signal including numbering and index information.

Below, a theoretical procedure for initial network synchronization will be discussed. Some of the requirements are shown by FIG. 7a showing network synchronization prerequisites for all required devices.

After successful programming of ail prerequisite parameters into the devices, the following tasks have been identified:

Task A-1: Estimate satellite beam hopping frequency and coarse phase by making use of modulator and reference terminal Task A-2: Adjust the symbol clock frequency and the coarse phase w.r.t super-frame boundaries, with possible signal disruptions (large phase offsets is covered)

Task A-3: Track symbol clock frequency to beam hopping clock (1 super-frame fits exactly into correct beam switching window (=phase, super-frame shall start within specified time window).

A concept has been investigated and is described in the following:

The following assumptions and prerequisites have been identified:

Knowledge of the configuration parameters by modulator, payload, and reference terminal according to Table of FIG. 7a.

Full synchronicity between the modulator and reference terminal either by connecting both to 10 MHz common reference (e.g. GPS based) or by slaving the terminal to the high precision modulator internal reference (or vice versa).

This method includes an initialization mode which finds the correct alignment between the super-frames and the coverages (C) within the beam switching time plan (BSTP) in operation at the satellite.

Reference signals that can be used for correct detection are:

- "beam-ID encoded in SOSF": Use part of the SOSF (making use of WH sequences) to signal the beam ID, requires finding 8 suitable sequences out of the 256 WH sequences
- "super-frame counter encoded in SOSF": Use part of the SOSF (making use of WH sequences) to signal the current super-frame ID inside the beam hopping frame, requires finding up to 64 suitable sequences out of the 256 WH sequences
- "beam-ID encoded in SFH": Use PIN pointer reserved values (0 . . . 15) for signaling of beam-ID in all bursts where the first codeword would start directly after the ST (in capacity unit 16)

But the main shortcoming of using these fields is that they should better remain standard, not carrying special information, as the overall signal is then better suited for operating standard terminals without interruptions and no special state signaling to the receivers is required.

Drift of symbol phase can be compensated by tuning the symbol clock frequency of the modulator based on the received status information of the reference terminal.

Capabilities of modulator are:
Find phase of beam coverages (C)
Compensate for symbol phase drift by tuning the symbol clock
Reference terminal provides status information to the modulator:
Flag: "SOSF (not) found" or "C (not) locked" or similar
Integer number: displacement of super frame starts within C in symbols
Additional information (e.g. PLH Pointer from SFH)

Below an example of a scenario for the phase acquisition is laid-out; explanations are given on how the modulator and the reference terminal interact in this concept.

Figure 2D:

The scenario uses the following assumptions as example:
known symbol rate
known beam switching time plan (length and sequence) with 5 coverages, 6 Super-frames (overall minimum 32 coverages can be supported, every coverage can include one or more SFs).
example: coverages 1 . . . 5 active
super frames with different SOSF patterns assigned, super frame SF-4 used as reference to be fitted to Coverage C-4 (reference beam)
switching pattern: 1-2-3-4-5-5
super frame format 4 which is shown by FIG. 2d, (or others) with super frame padding
reference terminal at location of coverage (beam) 4 or In split-beam configuration listening to beam 4 via sidelobes of the antenna.

After power-up the modulator transmits misaligned super frames w.r.t to the beam switching time plan (BSTP) of the satellite. Phase drift of symbols w.r.t BSTP is likely to occur due to non-synchronized clocks between ground and satellite and trip delay change (also doppler shift) caused by satellite motion.

Figure 3A:
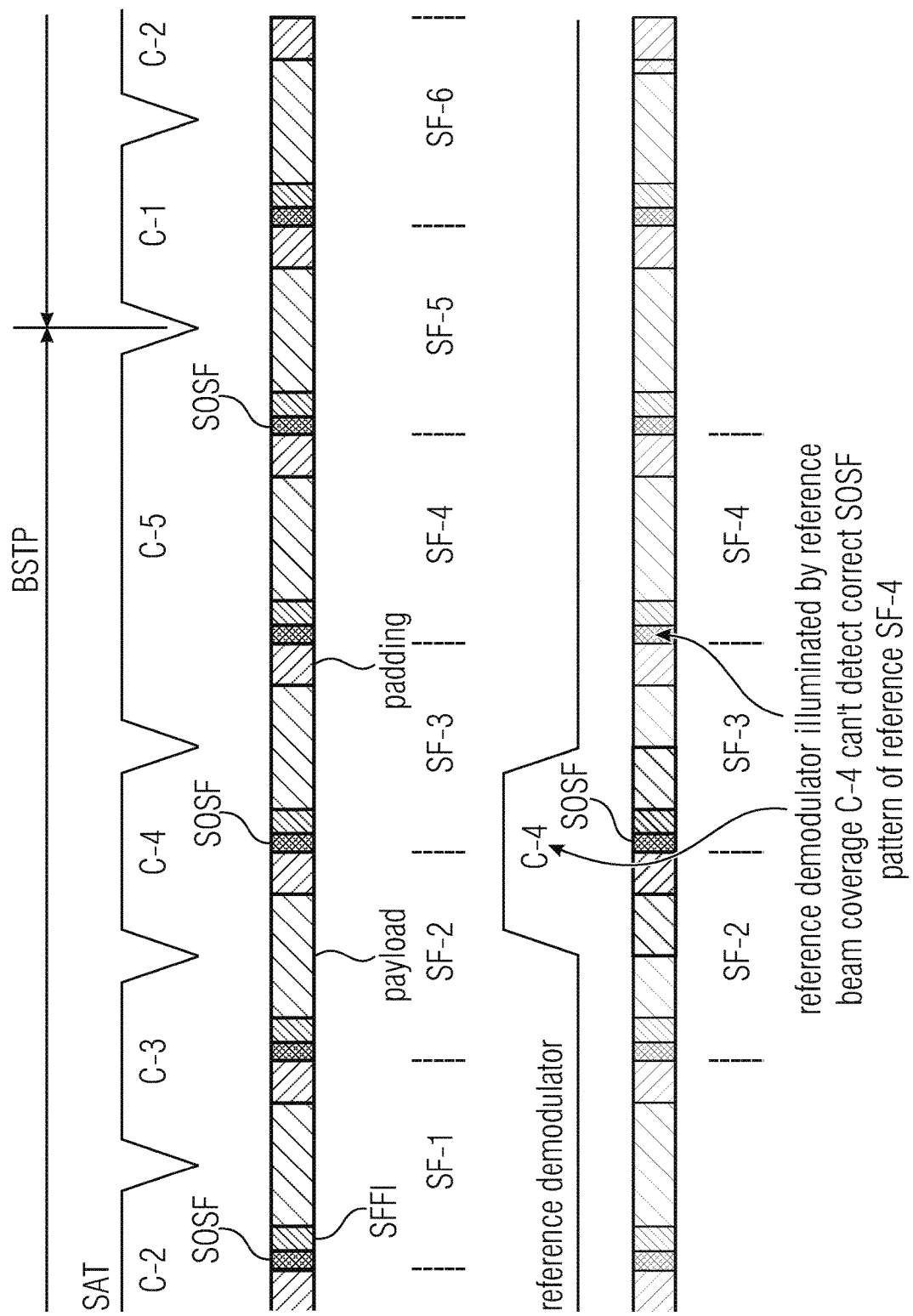
FIG. 3a shows schematic diagram of misaligned BSTP w.r.t. super-frame boundaries and beam hopping pattern to illustrate the aim of the synchronization process.

This misalignment BSTP w.r.t. super frame boundaries and beam-hopping pattern is illustrated by FIG. 3a. According to a first approach, the alignment/synchronization can be done as follows:

Step 1:
Modulator starts acquisition of the phase of the BSTP,
If super frames are not aligned to BSTP the reference terminal doesn't detect the correct SOSF pattern (or correct SFH).
The reference terminal issues a status information to the modulator: "BSTP not aligned"

Figure 3B:
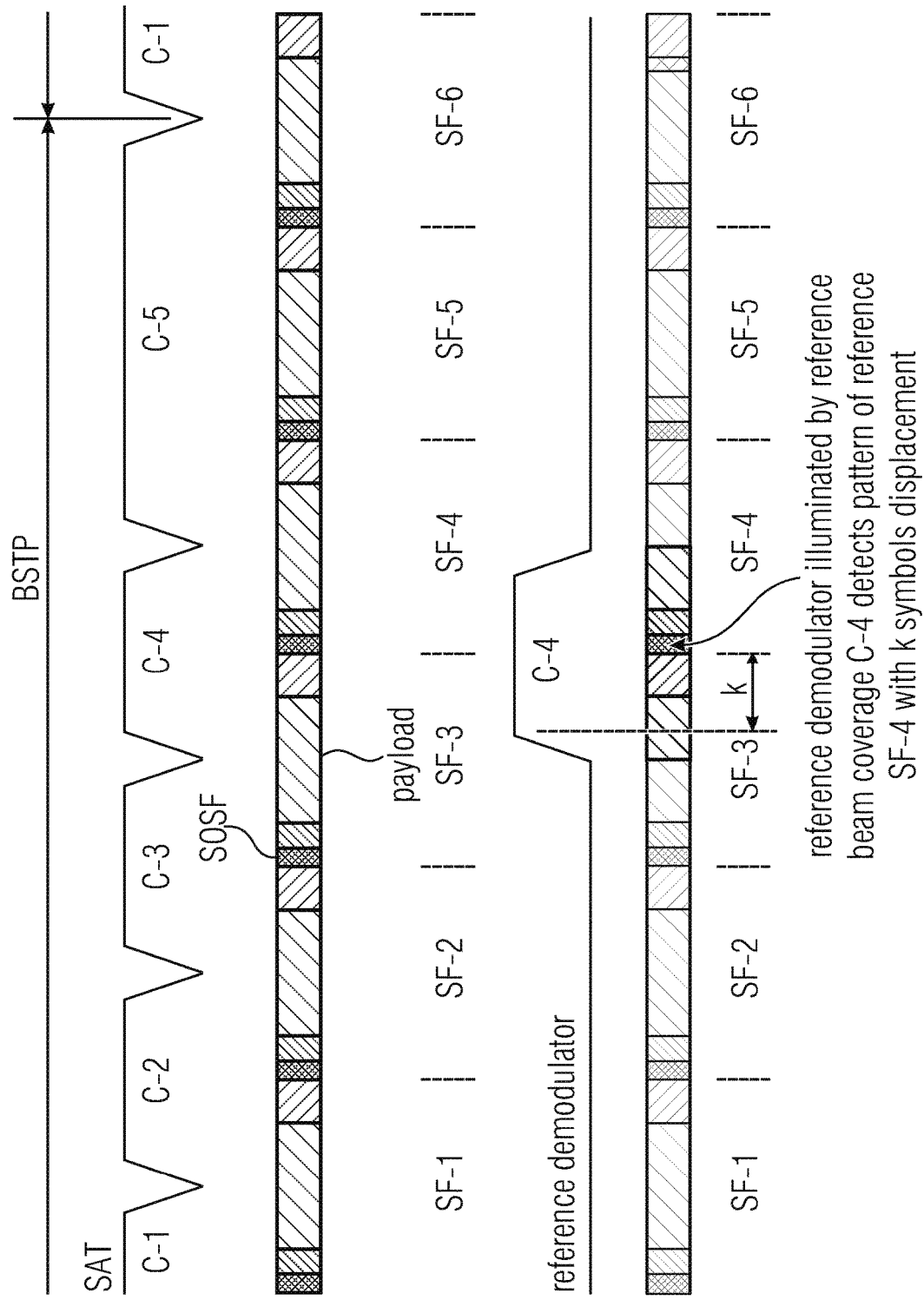
FIG. 3b snows schematic diagram of aligned BSTP w.r.t. reference Super-frame (still offset) to illustrate the aim of the synchronization process.

Step 2:
The modulator shifts beam switching pattern one step and waits for next status information from reference terminal.
The modulator repeats this procedure until the reference terminal detects the correct SOSF pattern (or correct SFH).
The reference terminal issues a status information to modulator: "correct BSTP alignment found" and "displacement of k symbols".
The modulator is now operating within coarsely correct BSTP but still not locked correctly to the start of the coverage C-4.
The aligned BSTP w.r.t. reference super frame (still offset) is shown by FIG. 3b. After that, step 3 of this method may be performed.

Figure 3C:
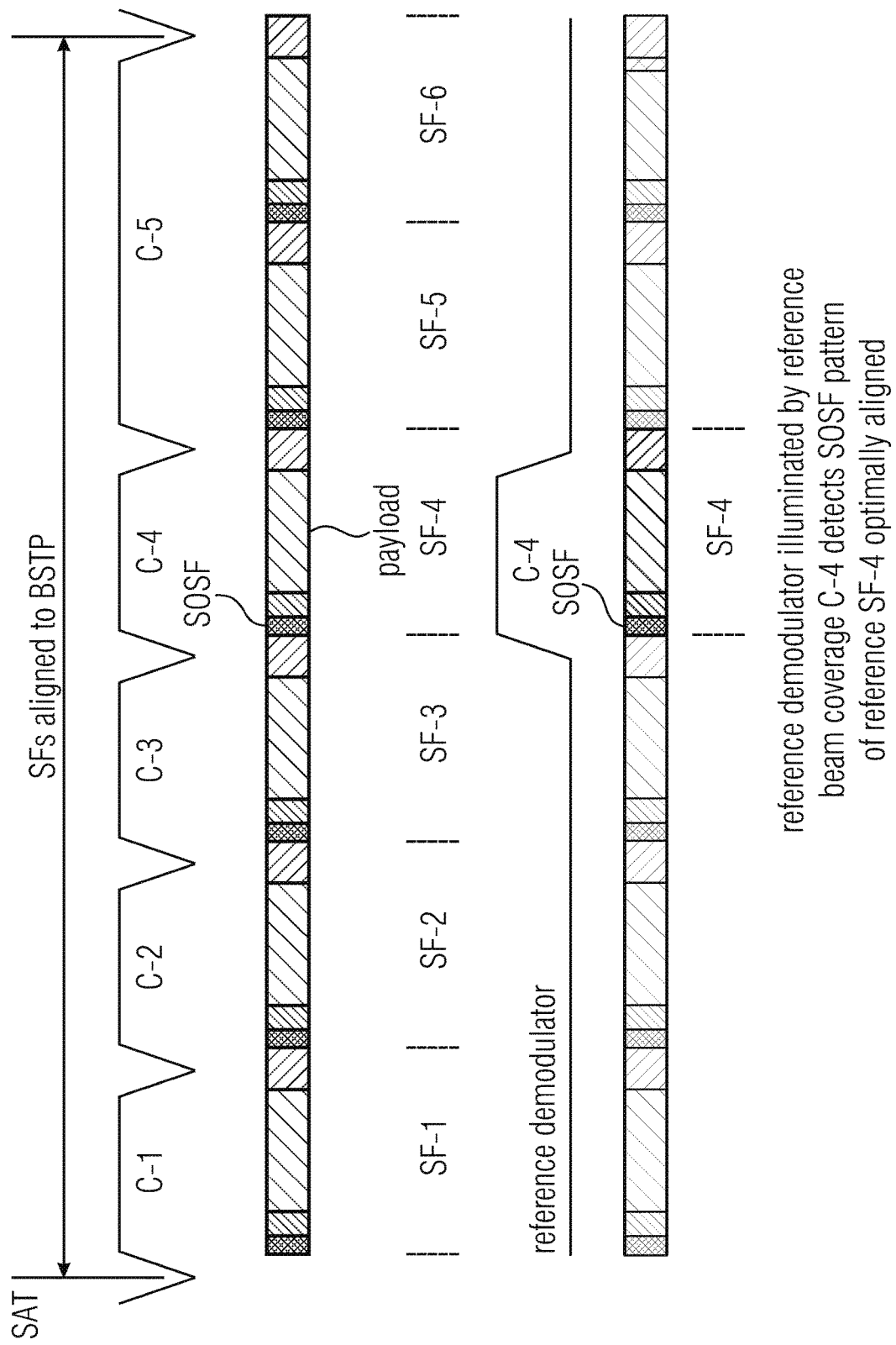
FIG. 3c shows schematic diagram of fully aligned BSTP w.r.t. super-frame boundaries and beam hopping pattern to illustrate the aim of the synchronization process.

Step 3
Ways to achieve correct BSTP alignment:
modulator varies the symbol rate in order to move the start of super-frame to the start position of the coverage.
Slow process, but can be implemented with exact ramping up and down of symbol clock.
if status information from terminal arrive irregular, situation may get worse,
modulator forces a k symbol shift,
quick action,
integrity of at least one super frame violated, which should be acceptable in this phase
After that, a fully aligned BSTP w.r.t. super frame boundary and beam-hopping pattern can be achieved as illustrated by FIG. 3c.

Step 4:
The modulator is now in normal operation. The super frames are aligned to the BSTP. The modulator tracks the symbol phase by fine tuning the symbol clock frequency.
it receives frequently status information from the reference terminal of drift of symbol phase. This may be expressed in integer number of symbols (still as k displacement).

Some problem with this method arises from the "tagging" scheme for the super-frames which is required to identify the correct super-frame used as reference. Using different special SOSFs may require enhanced complexity in signal acquisition from scratch, using different SFHs may require special extensions to this part of the super-frame specification. Also operation of this special initial phase format continuously may disturb standard receivers, so that it is required to switch over to normal operation as soon as possible, where this special frame tagging methods are not possible, although it seems highly advisable to continuously check and track correct super-frame alignment, requiring such type of tagging.

For this reason, the advantageous implementation is described in the following. Some details of the first described method, as e.g. qualifying requirements to detect loss of synchronicity shall be omitted here.

The below embodiment of the present invention represents an advantageous variant, wherein it should be noted that (most of the) steps and sub steps may be performed separated from the others, especially the substeps belonging to one step without the substeps belonging to another step. According to some embodiments the method makes use of the basic assumption that the modulator 12 and the reference terminal 14 (cf. FIG. 4*a*) are co-located, so that not only a reference clock can be exchanged between both devices but also a reference super frame indicator signal can be sent from the modulator 12 to the reference terminal 14. FIG. 4*a* shows the main signals reference super frame indicator 12*r*, reference clock 12*c* and reference terminal feedback 14*f*. The feedback 14 from the reference terminal 14 to the modulator 12 can comprise:

Clock drift of satellite clock through symbol offset change
Doppler shift of carrier frequency
Phase alignment of BSTP
Trip delay measurement through comparison of reference super frame reception and reference frame indicator signal
Indication for the time of the sync signal reception
Offset between labeling (and numbering) schemes and signal observations Details on the feedback information have been given above in connection with the properties of the reference terminal and of the satellite station.

The reference signal may be generated at the modulator synchronous with sending the reference super-frame, is delayed according to the expected signal trip delay and is forwarded to the reference terminal through a dedicated hardware signal. The length of the active state of the reference signal shall be exactly identical to the length of the SFs. The trip delay can be calculated initially from the earth station coordinates and satellite coordinates quite precisely. The only unknown parameter which contributes is the exact position of the satellite within its orbital box. Assuming a satellite orbital box diameter in radial direction of maximum 50 km (min approx, 20 km) from real satellite ephemeris evaluation, the roundtrip path may vary maximum by about 100 km, causing a time variation in trip delay of 0.33 ms.

The duration of a super-frame with 612540 symbols at 250 Msps (max rate) carrier is 2.45 ms. So, the uncertainty caused by the unknown initial trip delay is in range and can be accepted for the purpose to mark the beginning of the reference super-frame at the reference terminal. By comparing the reference signal indicator and the start of super-frame (SOSF) received back at the reference terminal the value for adjusting both can be directly calculated and also continuous measurement of the trip delay is possible.

This signal enables to eliminate the requirement for tagging reference SFs, allows using continuously standard signal elements for SOSF, SFH and allows continuous checking of the correct positioning of the reference SF within the intended BSTP. The reference super-frame can also be used for normal transmission (Important for using split beams as reference beams) as it has the same format like all other super-frames and is by this compatible to all standard receivers. Another result of this approach is, that all SF (on all coverages) can in principle be used as reference SF.

Initially the reference terminal only detects a start of any super-frame. If this is not reasonably fast possible to detect SOSF, as they may be located in time in the switchover periods of the satellite antennas, and are due to this distorted or not visible at all, a blind shift of ½ of a super-frame is required.

An alternative idea is to not only to rely on the detection of the position of SOSF but also on the detection of pilot fields from the center of a SF. The pilots are uniquely scrambled and pilots at specific places within the SF can also be identified with correlation methods. The pilot identification is perhaps useful as fall back if the SOSF cannot be identified and need to have not the same resolution precision as the SOSF. Precise adjustment can be done subsequently after this coarser adjustment using the SOSF.

The reference receiver can then calculate the difference in time between the detected start of any SF and the reference frame indicator signal (rising edge), to give information back to the modulator how much the reference SF need to be shifted in time to achieve an ideal match of the trip delay. The reference receiver can additionally or alternatively measure and calculate the difference in time between the detected start of SF and the start of the illumination period, so that the modulator can track the change of the BTSP pattern position in the satellite.

As the periodicity of the SF is advantageously fixed, the overall measured offset can be split into the following components: the multiple integer value of the length of a SF gives an indication about how many SFs the modulator shifts its BSTP cycle, so that it fits to the BSTP cycle of the satellite. The element to validate this is, that the reference SF signal marked by the reference SF indicator signal can be received through the satellite correctly as reference beam at this position in time. The remaining offset, after subtracting integer multiples of a SF duration, gives the value which is required as correction for the trip delay. The overall offset information can also be given to the modulator as information spilt into two values (offset in SF positions and fine offset). Fortunately, one can exploit the granularity of illumination duration to be a multiple of super-frames duration. Note that other framing concepts and conventions than the super-framing can be applied as well. E.g., one can specify and exploit cascaded super-frame durations, where there is a short baseline super-frame duration and the other super-frame durations are multiples of this baseline super-frame duration.

The following pictures illustrate the synchronization using this special hardware signal. The maximum number of coverages in a BSTP is 32.

Figure 4B:
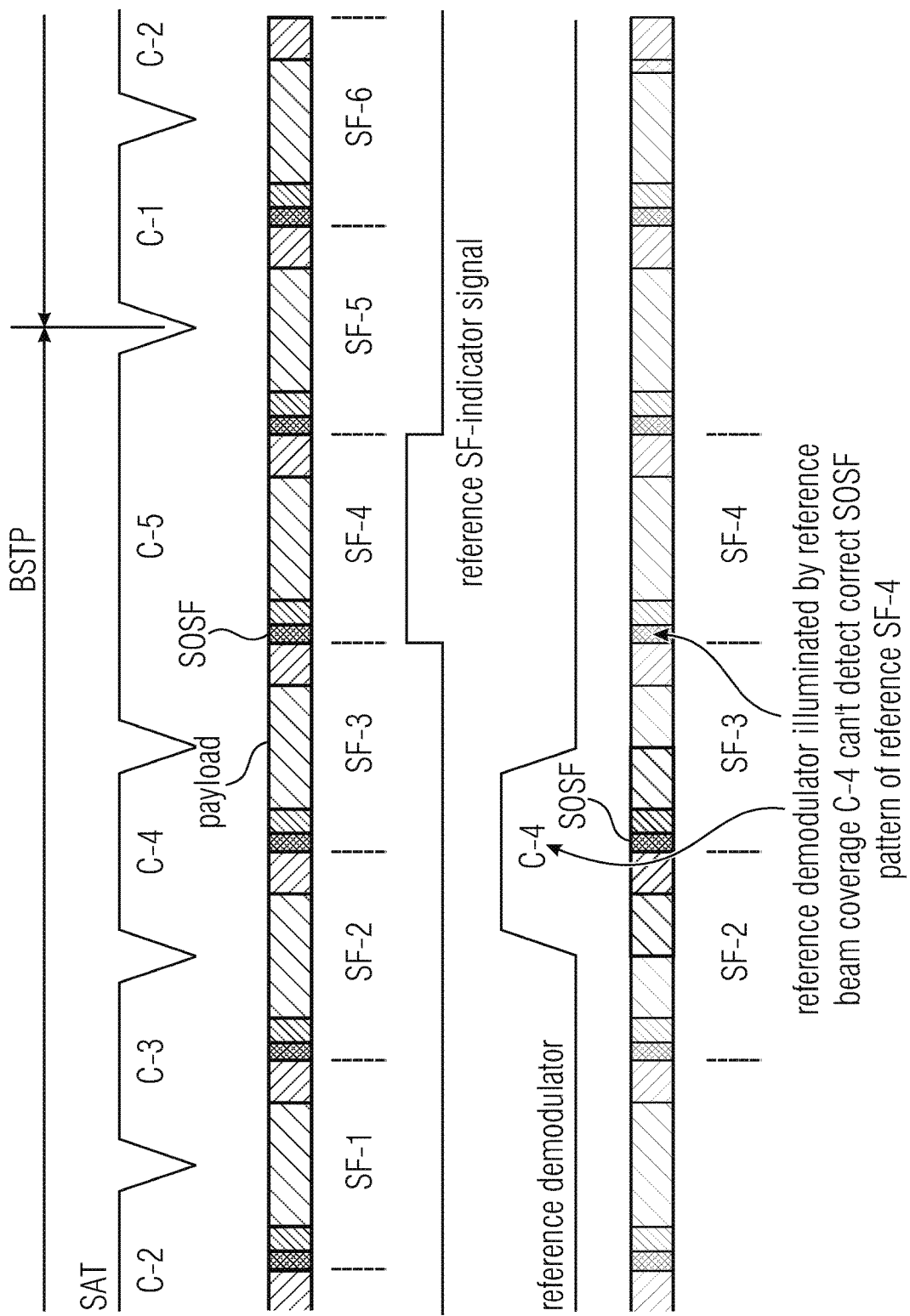
FIG. 4b shows schematic diagram of misaligned BSTP w.r.t. super-frame boundaries and beam hopping pattern to illustrate the synchronization process according to an embodiment.
Figure 4C:
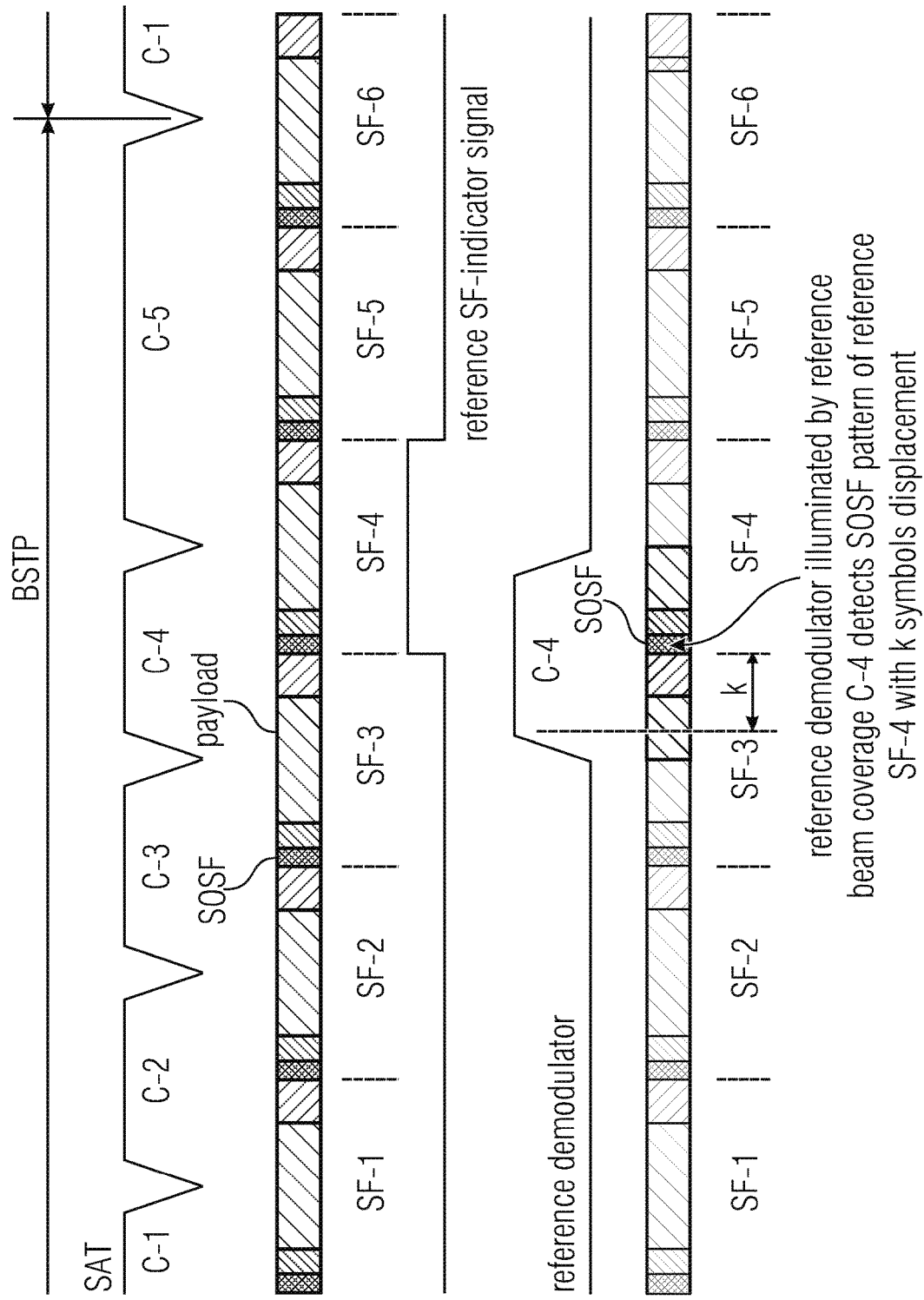
FIG. 4c shows schematic diagram of aligned BSTP w.r.t, reference super-frame (still offset) to illustrate the synchronization process according to an embodiment.
Figure 4D:
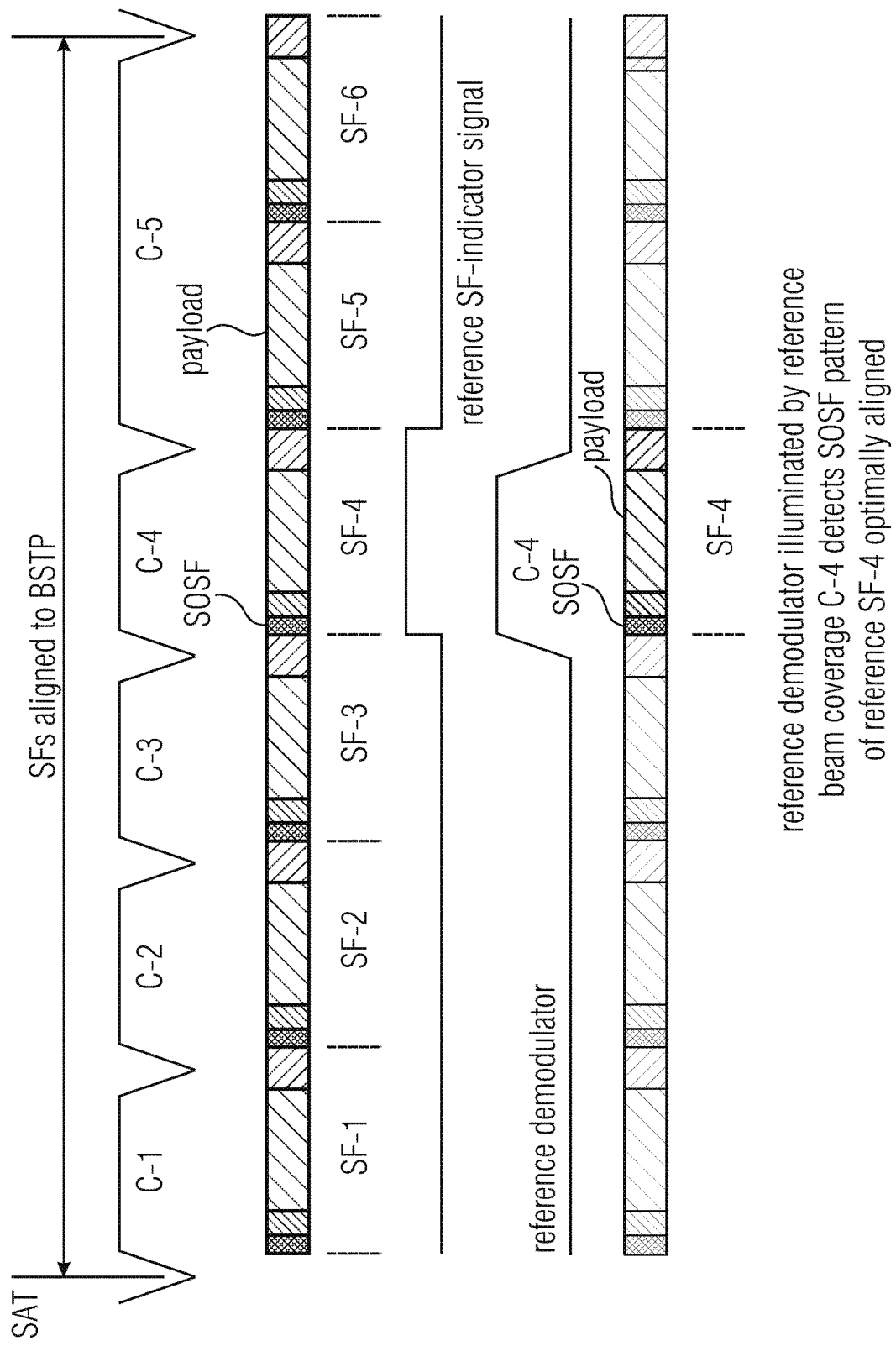
FIG. 4d shows schematic diagram of fully aligned BSTP w.r.t. super-frame boundaries and beam hopping pattern to illustrate the synchronization process according to an embodiment.

Starting from misaligned BSTP with respect to super frame boundaries and beam-hopping as illustrated by FIG. 4*b* the following steps are performed:

Step 1

Modulator starts acquisition of the phase of the BSTP.
if super frames are not aligned to the BSTP of the satellite the reference terminal doesn't detect the SOSF pattern at the position indicated by the reference SF indicator signal, The reference terminal 14/its controller 16 reports back to the modulator 12 or its controller 16, respectively, the difference in time between the rising edge of the reference SF indicator signal and the beginning of the SOSF sequence. The modulator can conclude through a modulo calculation on the SF duration how many SFs the BSTP pattern in the modulator is shifted. Through remainder of modulo calculation the real trip delay offset can be calculated and the trip delay can also be adjusted. Also, separate data on complete SFs and portions of the SF as real trip delay offset can be reported back.

As indicated above, the method may, optionally, comprise the following failure handling according to a further embodiment. A problem can occur if the SOSF falls into a switchover phase of the satellite antennas. In this case no SOSF at all could be detectable. Here a possible method could be to apply blindly a shift by ½ SF by the modulator, to make SOSFs again visible for the reference terminal. An alternative method could be to have also a detector running for the systematically scrambled pilots in the mid of the SF, which would also allow to conclude, what is the offset in time to be corrected omitting the requirement for applying blindly hard shifts in offsets.

This result is an aligned BTP with respect to reference super frame (still offset) as illustrated by FIG. 4c.

Step 2:

The reference SF is coarsely aligned.

The time offset between the SOSF and start of illumination is measured by the reference terminal. For this different method can be used, evaluating signal elements from the beginning of the SF mid of the SF or end of the SF can be used.

The position of SOSF can subsequently be positioned to a target position (which is a configurable parameter) in reference to the start of illumination. This is, for example, best done by ramping up symbol clock rate for period of time and down again, to adjust the offset in time.

Now, a fully aligned BSTP with respect to super frame boundary and beam-hopping pattern can be achieved as illustrated by FIG. 4d.

Subsequent Optional Steps:

The modulator is now in normal operation. The super frames are aligned to the BSTP. The modulator tracks the symbol phase by fine tuning the symbol clock frequency.

According to further embodiments, the above discussed method can be used during the normal operation mode to update the synchronization.

The reference terminal frequently reports to the modulator status of the SOSF alignment compared to the beginning of the illumination and also end of the illumination. It also reports frequently the SOSF alignment compared to the rising edge of the reference SF-indicator signal. These offsets may be expressed in integer number of symbols (still as k displacement) or also number of complete SF.

For example, changes in the trip delay are reflected completely by changes in offset between the reference signal edge and the SOSF, whereby the shift of the SOSF against the start of illumination only follows half of the change of the complete trip delay. This relation can be used within the control algorithm to improve the accuracy and dynamic performance of the control algorithm. Also, doppler shift values of the carrier frequency relate to changes in the trip delay and can be used to improve the accuracy and dynamic of the control algorithm.

The expected change rate of the satellite position, the resulting trip delay change and doppler shift values are discussed above, it results that for proper tracking at maximum change rate of the satellite orbit radius, control loop activity in the range of not more than some seconds is required. If outages should occur on the reception at the reference terminal site (e.g. by rain fade, sun outage, technical malfunction) the synchronicity can potentially be lost quite quickly. Therefore, precautions to continue tracking during outages, as close as possible to reality, should be foreseen, which can be implemented similar to technologies known from antenna tracking, which is:

memory track: to use the stored tracking data from the cycle before (day before)

program track: to use ephemeris data (available from the satellite operators) to follow a pre-calculated tracking scheme.

If still an offset should show up due to different reasons, whereby the SOSF, positioned normally early after the beginning of the illumination period, has moved e.g. Into the time period of satellite antenna switchover and cannot be detected any more, then special methods like blind ½ SF period switching, with heavy impact on the system, could be required to recover. This can be avoided if additionally, also offset information can be retrieved from mid of SF by analyzing the position of known pilots (as already mentioned under step 1).

By measuring and calculating 3 Items:
offset change between the SF and the reference signal
offset change between the SF and the illumination period
doppler shift
which relate to each in a linear way, 3 main unknown variables could be calculated:
change in trip delay
frequency offset between master ground clock and master satellite clock
frequency offset on the received back carrier frequency compared to the carrier frequency as transmitted (e.g. due to transponder LO offset and offset of frequency converters in the uplink and downlink).

This may help to separate different influences and can help to optimize the control loop operation.

Figure 5A:
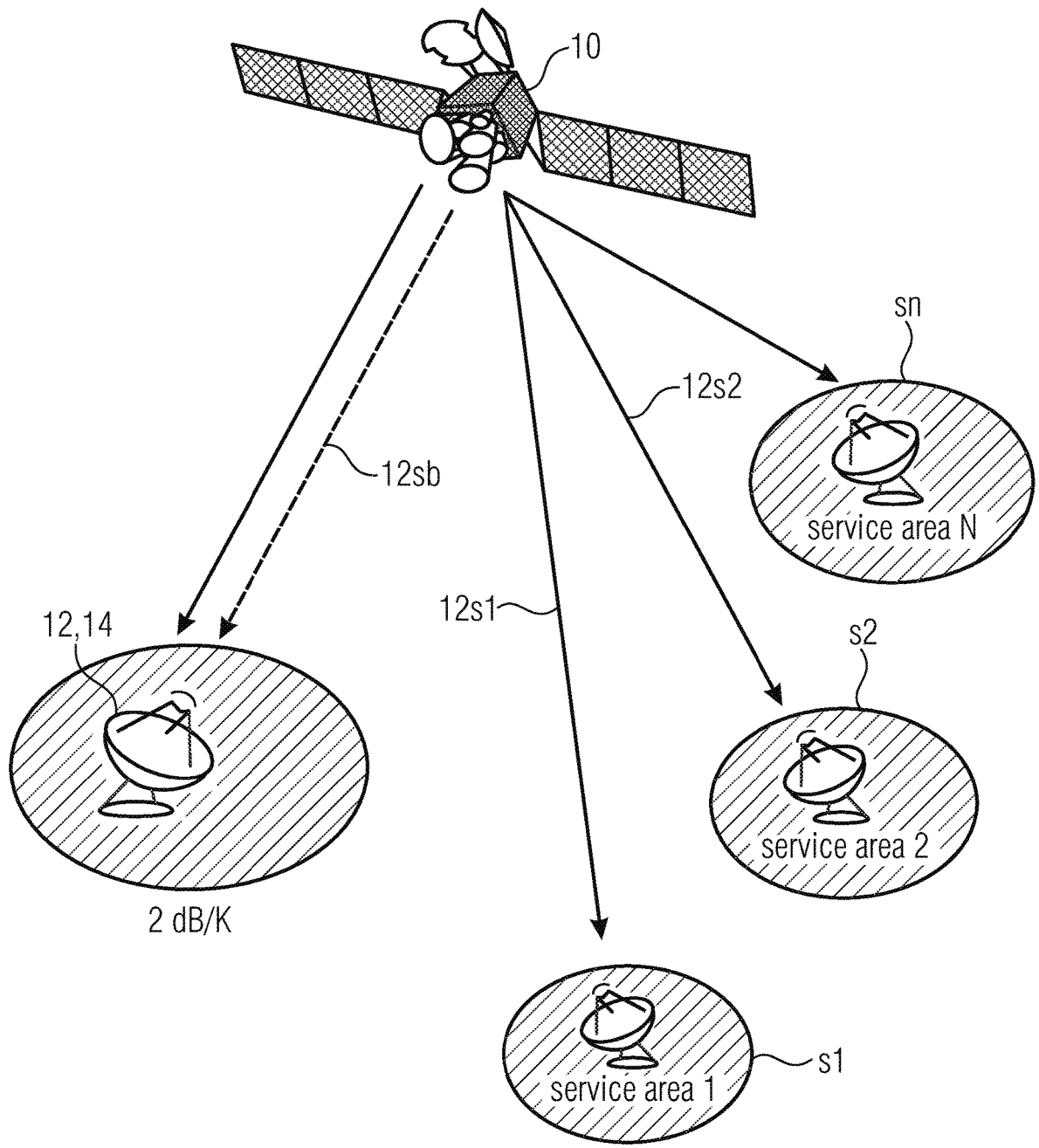
FIG. 5a shows an example for a beam hopping area diagram.

According to further embodiments a false reference beam identification is possible. A principle problem may arise from the situation that a normal service beam may eventually leak into the reference beam area (gateway area, reference terminal position). In FIG. 5a, only a nicely spaced situation is shown (comparable to FIG. 1a). But it could also happen that a normal service beam 22sb overlaps partially with the reference receiver location or leaks a signal into this area, e.g. s1. It could then happen that a beam for a normal service area (coverage) can be misinterpreted as the reference beam. This can cause a complete misalignment of the super-frames to the BSTP.

The probability for such misinterpretation is difficult to analyze, because it depends on operational parameters as well as on antenna directivity parameters.

A remedy for this can be to evaluate a—power step signal from the satellite in timely coincidence with BSTP period or BSTP update cycle period. Alternatively, also a switch in time of the reference beam signal in timely coincidence with a BSTP counter period can be considered as alternative type of sync pulse signal for verification.

With the split beam method for the reference beam a regular switchover of the reference beam to another coverage shall be used for the verification.

The above method described in context of FIG. 4 can be summarized by the six basic steps:

1. The modulator transmits a high frequency signal based on frames/super frames as reference super frames in accordance to a beam switching time plan which is not necessarily synchronized at the beginning. In parallel, a so-called reference super frame indicator is transmitted to the reference terminal,
2. The satellite forwards according to the beam switching time plan the high frequency signal including the reference super frame.
3. After that, the controller or the reference terminal measures the difference (In time and/or in content)

between the received reference signal and the HF downlink signal from the satellite.
4. Now, the reference terminal or the controller forwards a feedback message regarding the measured values to the modulator, such that the point of time for the transmission for the subsequent data super frames can be adapted,
5. Now, the modulator analyzes the feedback message and adapts the point of time for the transmission and/or further parameters of the HF signal (and the reference signal). This adaption can be performed instantly, incrementally or continuously. Here it should be noted that the analysis of the feedback could, according to further embodiments, be performed by another entity, e.g., the controller.
6. After the steps 1 to 5, these steps are iteratively performed, in order to enable a further coarsely adaption or In order to enable a fine tuning. Here, this sixth step may be performed during the normal operation.

Regarding the adaption of the transmission time, it should be noted that alternatively the beam switching time plan may be adapted.

The result of the six method steps is that the framing and the frame boundaries of the modulator are synchronized with the beam switching time plan/the point of times of the switching between the beams so that the right frames are delivered to the right service areas via the right beams.

Another advantage is that the symbol rate of the modulator is adapted to the dock of the satellite. Additionally, this method enables to determine the Doppler shift (e.g., due to a motion of the satellite (so that the symbol rate ears be adapted to this shift).

According to an embodiment, the synchronicity may be maintained by double checking the synchronicity during the operation. Here, a reference beam is transmitted to the reference terminal for double checking the synchronicity. For example, the reference beam may be split off from another data beam, wherein the reference terminal receives an information, e.g., the coverage ID to identify the reference beam. The reference terminal may, for example, measure the time difference between the known sequence (e.g., start of super frame) and the illumination time window, i.e., to a point of time of the beginning illumination of the reference terminal.

According to a further embodiment, the synchronicity may be verified (especially during the normal operation mode) by use of the following method:
1. The modulator transmits the beam switching time plan command or another control command to the satellite, such that same reacts to the received command and generates a good detectable transmission element. Hers, the beam switching plan may be updated or a signal strength variation of one or more beams may be performed, e.g., by expanding a beam or causing another split beam. This signal strength variation is detectable, but does not influence the transmission content. Another advantageous alternative is to update the beam switching affiliation. This means that the basis for splitting up the reference beam is switched. For example, if the reference beam is typically switched from the first beam (assigned to the first service area), the beam switching evaluation may now be updated such that the reference beam is split from the second beam (associated with the second service area).
2. The satellite reacts on the update and outputs/forwards the super frames in accordance to the updated beam switching time plan or the updated split beam affiliation to generate the good detectable transmission event. This may be performed after a short time period, e.g., at the next symbols,
3. The reference terminal detects this event and measures the difference between the reference signal and the event. Here, the reference signal may indicate the expected transmission of the event. The addition of the difference may be measured with regard to the content or with regard to the point of time.
4. Also, the reference terminal or the controller of the reference terminal forwards a feedback message comprising the measurement values to the modulator or the controller of the modulator.
5. The modulator or the controller of the modulator analyzes the feedback and adapts the point of time of the transmission for further super frames. Alternatively, other parameters may be adapted. Here, it may be beneficial to increment a counter which counts the detected elements so as to verify the synchronicity and to ensure that no reference signal (detectable event) was missed.
6. After step 5, the steps 1 to 5 are iteratively performed, in order to ensure/maintain the synchronicity.

The result is to continuously maintain synchronicity between the beam switching time plan and the transmission of the modulator so that the right frames are transmitted using the right beams.

Below, this second method may be discussed in further detail, especially events which can be detected by the reference terminal and other means for verifying the synchronicity may be discussed: a good detectable event is a sync pulse signal from the satellite. For example, there could be a type of sync pulse signal available from the satellite, to indicate the event of a switchover of a beam switching time plan (at the end of a BSTP update period). It has been discussed that this event may be marked, visible to the ground, by a defined increase or decrease of signal power from the satellite. But in some embodiments this cannot be realized as a pulse signal (active for only one reference super frame) after or before a switchover for various reasons.

This signal would be transmitted to the reference beam coverage, so that it can be received by the reference terminal.

In some embodiments such a sync pulse signal (visible on ground) can only be implemented as a step change of power applicable for the reference beam. Such a change can be implemented similar to any other change of the antenna patterns, but then stays constant until the next change of antenna patterns, which last at least for a complete BSTP update cycle. Also, only a temporary decrease (not increase) of signal power (e.g. by 5 dB) Is feasible, and because of link budget limitations (as usual under normal conditions) the signal is brought back to the normal higher nominal setting as soon as possible.

With such a power step signal in timely coincidence with the last reference SF of a BSTP update cycle or the first reference SF of a new BSTP update cycle (see FIG. 6c) a further checking feature would be available to verify that the reference beam SF signal is really transmitted through the reference beam coverage of the satellite, and not e.g. by false initial synchronization through another coverage, where e.g. the signal is just leaking to the reference receiver position. By this false reference beam synchronization onto a leaking other beam (coverage) can be detected.

Another way to verify initially and check continuously that NW synchronization is established and in place is not to change the power of the reference beam but change the time of the reference beam. As in this case not necessarily always the BSTP plan itself should be changed, it would be required to use in spilt reference beam mode another beam (coverage) served at another point time as the source for the split beam. Such switchover could also be implemented in an alternating way, allowing more regularly to check full NW synchronization. See also FIG. 6b.

This switchover of the source of split beam to another coverage shall be used as baseline for verification. To summarize, the sync pulse may, according to embodiments, be used as good detectable event and for verifying the synchronicity.

According to another embodiment, a numbering information on the reference super frame may be compared to this identification information of the reference super frame indicator signal.

The reference super frame indicator signal generated by the modulator and sent to the collocated reference receiver can be used additionally to transmit also numbering or labeling information for the super frames in reference to the BSTP or BSTP counter periods.

The minimum length, where this signal is active, is identical to duration of a super-frame with 612540 symbols. At a symbol rate of 250 Msps this result to 2.45 ms.

By feedback information from the reference terminal the position of the reference signal is continuously adjusted to the round-trip delay of the satellite. The round-trip delay can be measured by this.

The concept is to send with a modulation scheme similar to asynchronous data transmission:
  1 Byte of information (maximum 256 values are possible) as indicator to which coverage a transmitted SF is related (max 32 coverages are foreseen here)

This information sent from the modulator shall be used for the following purpose:

The same index for the coverage area as sent through the reference indicator for the reference super frame is used to select on of 64 possible Walsh-Hadamard sequence for the SFH-Trailer (ST) In all super frame headers, according to their position with the BSTP and the related coverage area index. As in some embodiment only up to e.g. 32 coverage areas shall be handled, this fits well with leaving also some margin.

This method of using the ST field is possible for the super frame format 4. For super frame formats 2 and 3 the first P2 field in the SF could be redefined to be used for such purpose.

This Information can be used by normal user terminals for orientation within the BSTP. The reference receiver can monitor this information from within the satellite signal and monitor the information received over the reference SF indicator signal, and can inform the modulator. The modulator can detect by this coarse trip delay assumption errors on the positioning of the reference SF indicator signal.

This is only an optional feature for implementation, as coarse trip delay errors can be omitted with correct trip delay calculation from the position coordinates of the satellite and the gateway. The reference SF indicator signal will give enough guidance to the reference terminal to identify the correct reference beam,
  2 Bytes of information for the BSTP counter value, from duplicating the BSTP counter cycle of the satellite within the modulator (and used for some further state signaling).

If a BSTP contains more than 1 SF the header bits are only inserted at the beginning of BSTP (at the first SF).

This information sent from the modulator shall be used for the following purpose:

This 2 Byte number range result from the following calculation:
  The max. duration of a BSTP counter cycle is e.g. 75 s
  A BSTP consists of minimum 2 SF
  The minimum SF duration is 2.45 ms (@ 250 Msps).
  So worst case the number range for BSTPs within a BSTP counter cycle to cover is: 75 s/(2*2.45 ms)=15306 values.

With 2 bytes (16 bits) a numbering scheme of maximum 65536 values could be supported. But also, to use 14 bits is enough, as a numbering scheme of 16384 values is supported.

The two highest bits (bit 15 and bit 14 with LSB as bit 0) shall be used for the following purpose:
  00 regular BSTP counter cycle, no switchover of a BSTP has happened before or will occur within the next counter cycle
  10 last BSTP counter cycle before a BSTP plan switchover
  01 first BSTP counter cycle after a BSTP plan switchover
  11 not assigned These special signaling shall be used to make the reference terminal aware to check specifically for inconsistencies during the reception of reference beam SF and memorize first ail such effects. Because if there is a misalignment of the BSTP update cycle in the satellite and the BSTP counter realized within the gateway, gateway and satellite will at different times switch to the new BSTP. The reference terminal will inform the modulator at which BSTP counter value the switchover happened or a sync pulse visible on ground (In one or the other way) was detected, and gives a clear indication about the counter offset, which can subsequently immediately be corrected.

If everything is aligned the period counter detected immediately before the sync poise (in one or the other way) is 0, which can be used to consider this synchronization loop as locked.

Figure 5B:
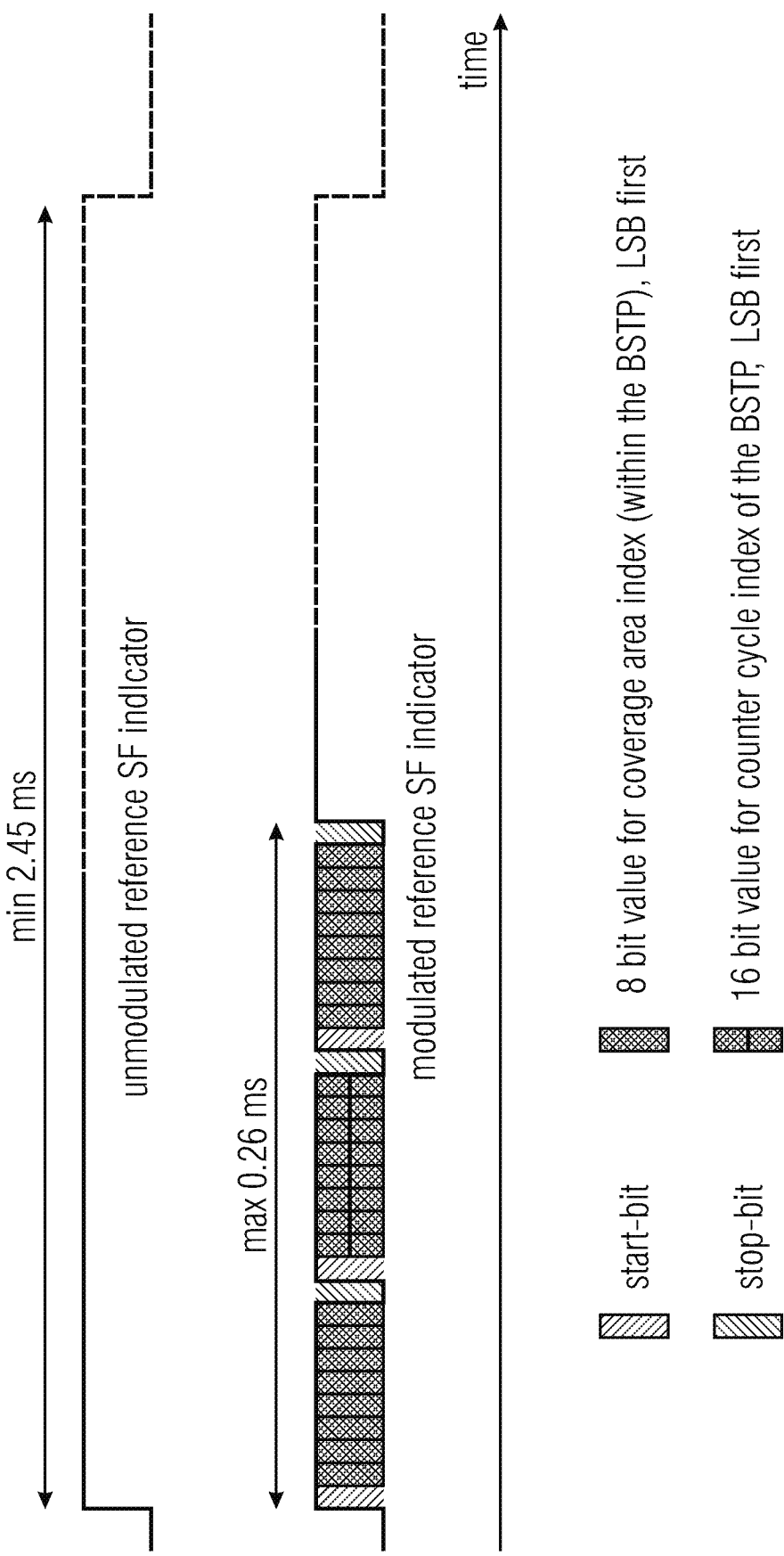
FIG. 5b shows a reference SF indicator signal carrying also numbering and index information.

To transmit altogether 3 Bytes with an 8N1 asynchronous format (1 start bit, 1 stop bit per Byte) requires altogether 3*(8+2)=30 line bits. This should fit safely into the min. duration of reference indicator high period (2.45 ms). This results in a minimum baud rate, to be used, which is 30 bits/2.45 ms 12245 Baud/s. This can quite easy be realized, so a standard higher baud rate of e.g. 115.200 Baud/s shall be used. In this case the duration of the 30 line bits is 30/115200 bits/sec 0.26 ms. This information shall be sent immediately at the beginning of reference SF indicator. See FIG. 5b.

Figure 5C:
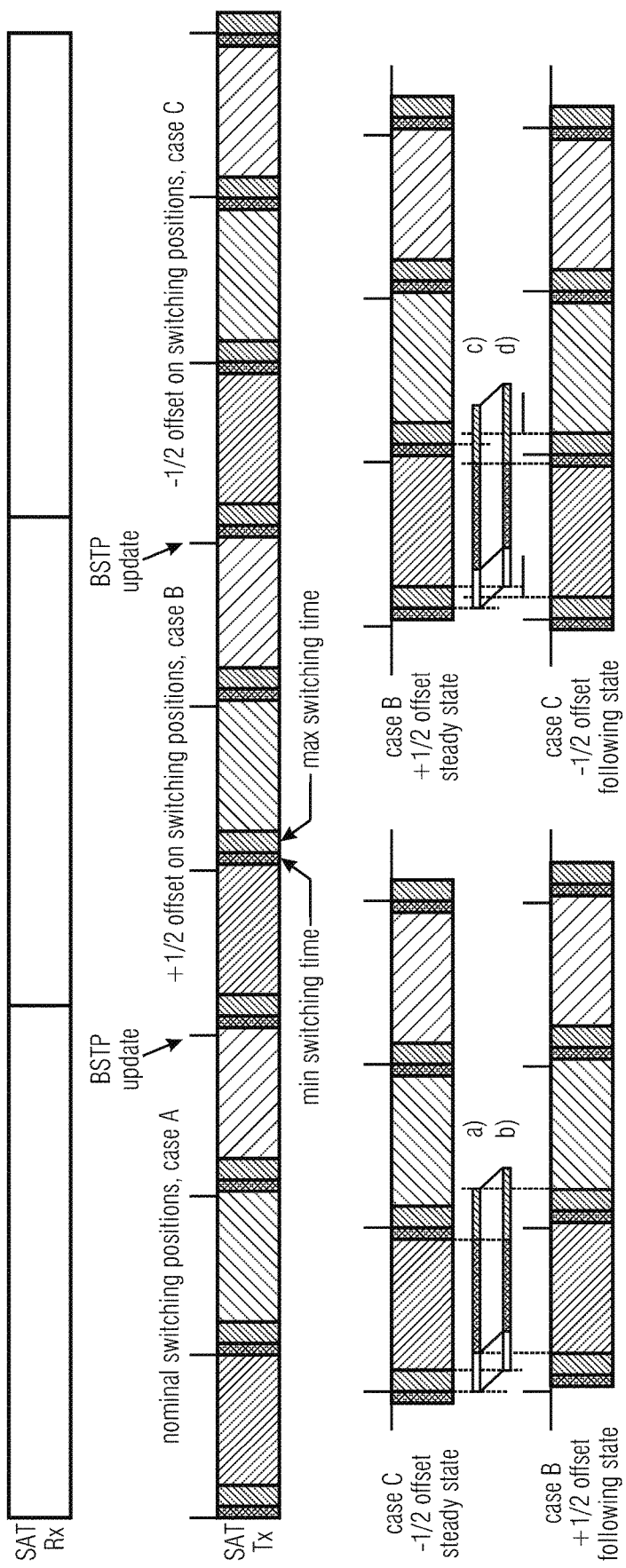
FIG. 5c illustrates a satellite BSTP switching uncertainty evaluation.

According to another embodiment, switching times of the satellite need to be considered. For the detailed alignment of the super-frames within the BSTP information about the ideal positioning in reference to be beginning of the illumination of the reference coverage and the required guard symbols at the end of each super-frame is required. Also, depending on the operation of the lower level physical layer alignment measurement, performed by the reference terminal, offsets in positioning the SFs into the coverages need to be considered. A minimum number of required guard symbols result. The control loop operation as shown coarsely in FIG. 6d will result in general, after settling, in a steady state control loop situation for a specific BSTP. If with a new BSTP a time position variation of the observed SF within a coverage occurs, then momentarily also the new position should allow uninterrupted transmission of relevant data, until after a while a new steady state condition has settled. Moreover, it is important to evaluate that enough similarity in terms of illumination time position and duration (in reference to the fixed switching grid) between the reference beam and the other beams exist, so that data transmission is possible through all points of operation. For this it is considered to be important to know minimum and maximum switchover times and possible variations in timing offset from one to another loaded BSTP. Evaluations have been made for worst case situations, as shown in FIG. 5c.

Only in case that the max switching time is equal to the min. switching time (so no time variation of this parameter is observed) and a possible timing offset in the position of the BSTPs is zero, the dummy symbol time results to:

Dummy symbol time=max switching time and the first super frame can start immediately with the start of illumination (guard time=0)

The underlying assumptions here are:
The offset measurement is done on the beginning of the super-frame
The end of the usable transmission period is given by the nominal switching poin.

For other situations a longer dummy symbol and a specific guard time at the beginning of the illumination period, before the start of the first super frame, may be required.

All switching time uncertainties can be compensated by a suitable super-frame guard time and a sufficient number of dummy symbols, which at least in super-frame format 4 can be set very flexible.

These two parameters are configurable over a reasonable wide range for the operation of the gateway and the control algorithm.

According to a further embodiment, a beam switching time plan update can be determined. A BSTP may need to be updated from time to time. For this an action is required which is correlated in time precisely between the satellite and the modulator. A delaying factor may be the long loading time.

Note, for updating the BSTP, the data requirements of the different service areas may be analyzed. There may be also on the satellite a mechanism operational, which delays the update to a specific point in time and which has a regular but configurable period. The period of this delay cycle may be e.g. 75 sec. By this a significant time margin is achieved to send normally update commands with some variation in transmission and execution latency to the satellite.

A power step signal on the reference beam or a reference beam can be generated by a normal BSTP update in the satellite The satellite clock may not be synchronized to standard time with enough high accuracy. Therefore, no precise time tags can be used in reference of standard time, where configuration changes are applied at the satellite But at least it seems feasible to send a command so that they it arrives in time before the end of a update cycle, once this position in time of this regular update cycle is known.

As initially the points in time where the update cycle in the satellite reaches its end cannot be measured on ground directly, there seems to be no other way than to upload a slightly modified BSTP and have it updated first of all blindly at some future point in time. The modified BSTP needs to include a property, such that the reference modulator can easily detect the update within the satellite, as soon as it occurs. A solution for detecting these changes is to change the position of the reference beam with every BSTP update or to change the signal level of the reference beam.

The concept is to duplicate the delay cycle with a BSTP cycle counter within the modulator. If both have the same phase, and updates requests are sent to the satellite sufficiently ahead in time, both the satellite and the modulator will update at the end of the same BSTP.

In the beginning or after an outage a task to be accomplished is to find out an initial phase offset between the update cycle in the satellite and BSTP counter cycle in the modulator. For this the only possibility seems to be to command blindly a change of the BSTP at the satellite and perhaps also switch the modulator BSTP at the end of its, up to now, not synchronized internal BSTP counter cycle.

3 situations can occur:
A) The satellite switches earlier then the modulator
B) The satellite switches later than the modulator
C) The satellite switches exactly at the same BSTP as the modulator There have been different ways identified to apply changes to the satellite BSTP and the modulator BSTP, and to allow the reference terminal to identify a switchover of a BSTP:

Method 1: The position of reference beam is related to the same coverage, a dedicated beam, loopback beam or split beam can be used as reference beam. The switchover to a new BPST includes at least a switch of the time position of the reference beam. This switch in time can be detected by the reference terminal.

Method 2: The position of reference beam can be related in split beam mode to different user beams of different coverages. The switchover to a new BPST includes at least a switch of the time position of the reference beam, by moving at least the position of the reference beam from one coverage to another, and by that changing the time position of the reference beam within the BSTP. This switch in time can be detected by the reference terminal.

Method 3: The signal level of the reference beam can be advantageously in split beam mode be adjusted up and down from one BSTP setting to a new one. The position split beam can stay constant in relation to the coverages. The reference terminal can detect the change in signal level of the Ref Beam as feedback from the satellite to an update to a BSTP plan.

Figure 6A:
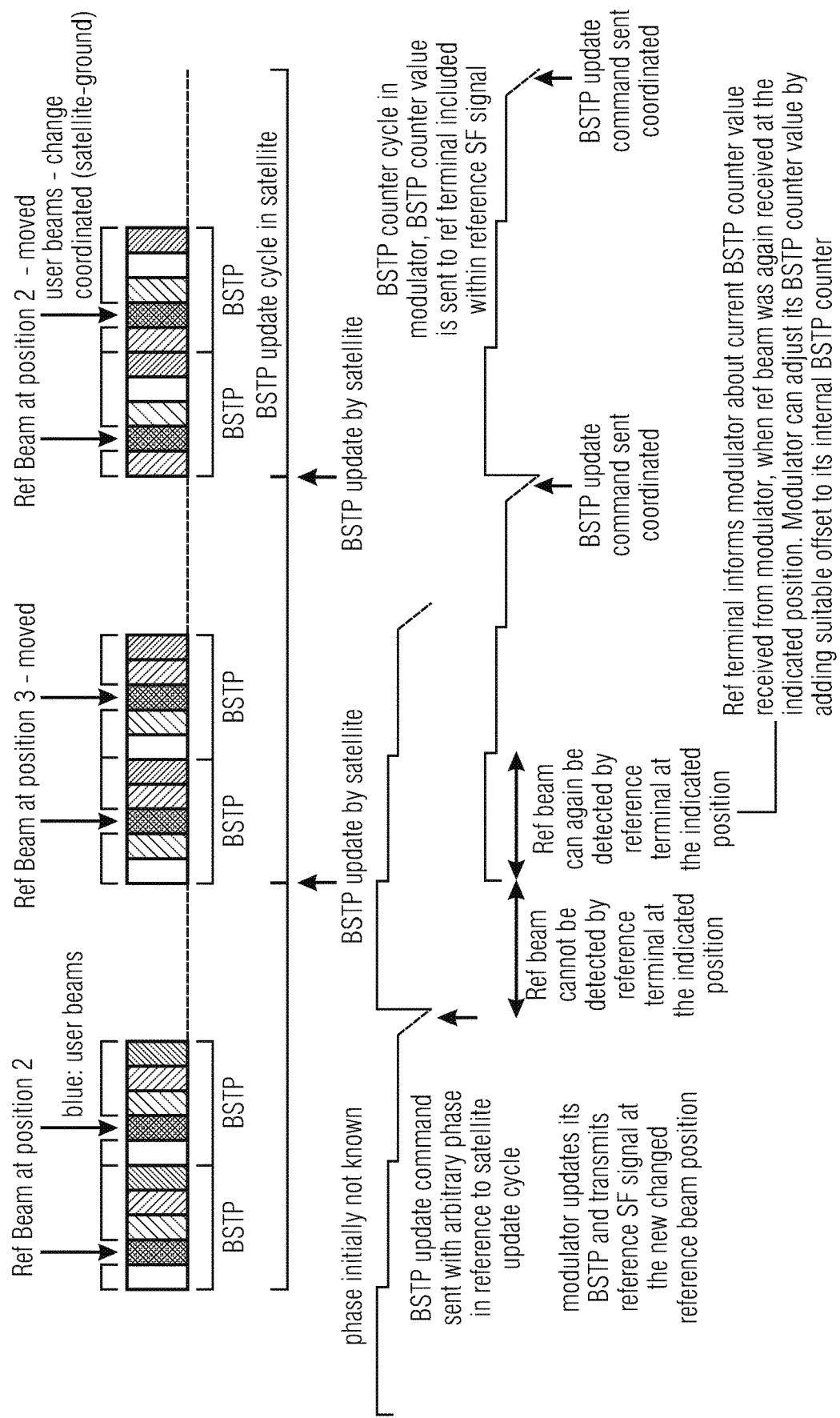
FIG. 6a, b, c illustrate different BSTP counter synchronization methods.

For method 1 the reference beam position shall change from BSTP to BSTP update. FIG. 6a Illustrates the foreseen procedure.

To mention here is, that the BSTP primary synchronization is already established. The reference SF indicator signal will control the reference terminal to receive the reference beam validly only at a specific position during the BSTP.

With the help of the continuous transmission of the current BSTP counter values of the modulator through the reference beam indicator signal to the reference terminal the modulator informs the reference terminal continuously about its counter value. It is assumed here that the counters are counting down and a switchover can only occur at counter value 0, where at 0 also the counter values are reloaded to their nominal max value, defining the duration of the cycle.

If initially or after an outage of the control loop the two counters are not aligned the following cases can occur:

Case A (described above): in this case the reception of a reference beam SF in reference to the indicated position stops after the indicated BSTP counter value was non-zero and continues at a value which is zero in reference to the BSTP counter value of the modulator. The reference terminal informs the modulator, about this none zero counter value, and the modulator decides which offset applies to achieve sync for the next counter period.

Case B (described above): In this case the reception of a reference beam SF in reference to the indicated position stops after an indicated BSTP counter value which is zero and continues at a value which is non-zero in reference to the BSTP counter value of the modulator. The reference terminal informs the modulator, about this none zero counter value, and the modulator decides which offset applies to achieve sync for the next counter period.

Case C (described above): In this, during initialization, rare case, the reference beam SF is at the planned position. The reference terminal informs the modulator, about this zero-counter value. No correction of the BSTP cycle counter within the modulator is required. Case C is the normal case after synchronization has been achieved.

Method 1 causes at least a change in time of two Beams. If initially blind BSTP updates shall occur with minimal interruptions to operationally used SF within the BSTP, SF used for the reference beam position before and after the update cars be affected by interruptions. Such SF should ideally not carry any additional user traffic. In case of initial blind synchronization, only the reference beam positions shall be changed, all other user beam positions shall keep unchanged within the new applied BSTP. This procedure can be used for reference beams of the type dedicated beams, loopback beams or split beams (in case of split beams it is assumed that the split is also generated from the same beam (coverage).

Figure 6B:
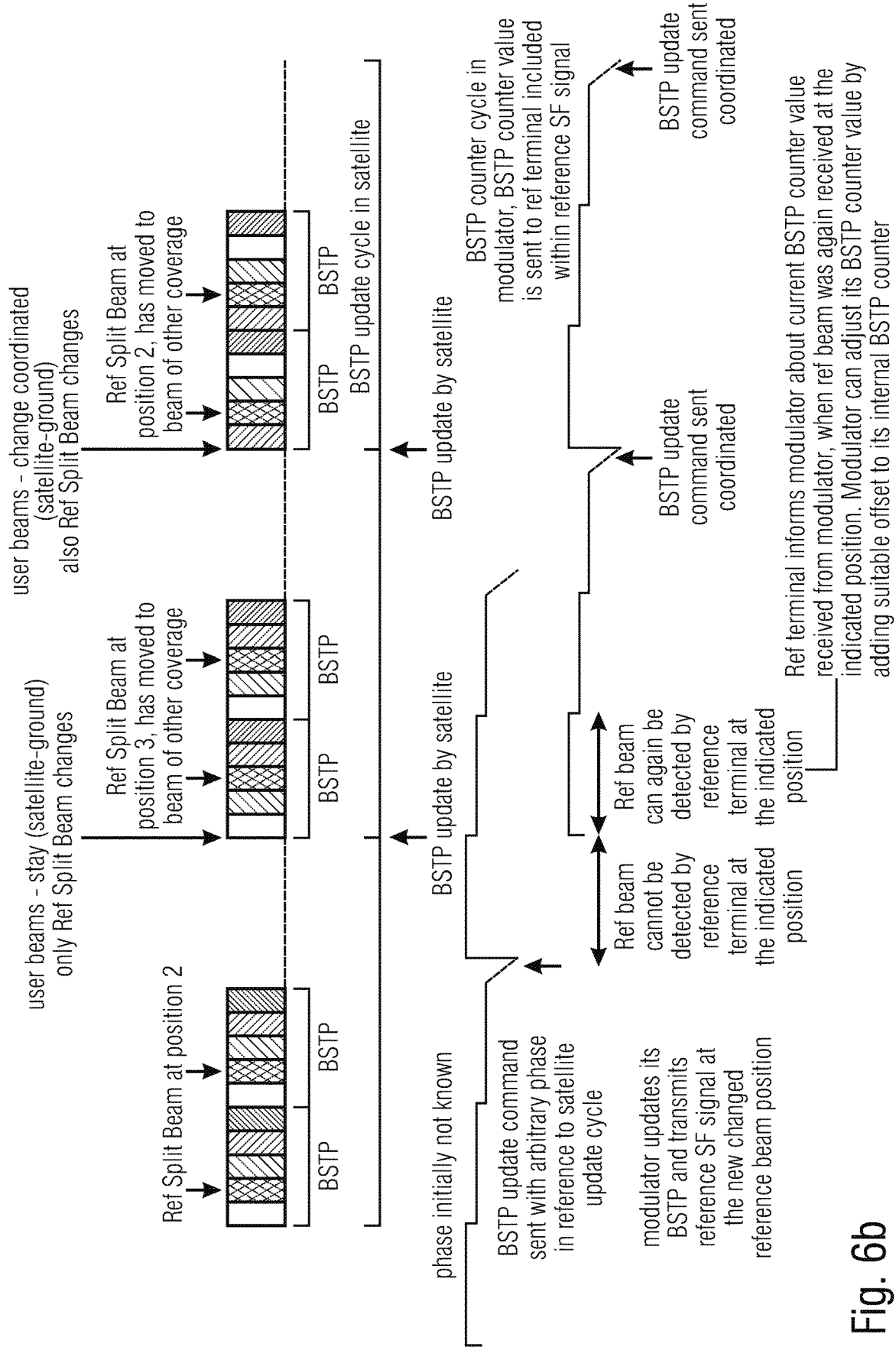
FIG. 6d illustrates overall coarse flow diagram for network synchronization and tracking according to an embodiment.

If only spilt beams are considered as reference beams, then method 2, as illustrated in FIG. 6b can be used. Using only split beams as reference beams allows to use another way of signaling the switchover at the satellite, which is to not change the sequence of beams and also user beams necessarily, but only to use another beam (coverage) for the split beam, which also changes the position in time of the reference beam, without affecting too much the user beams.

If synchronicity is not yet guaranteed, only moving the spilt beam to another user beam (coverage) allows observing, if the satellite counter cycle and gateway counter cycle are aligned or not, and if not, how much shift is required. Such testing on the satellite counter cycle does not interrupt any user traffic in this case, so it has the least impact on system operation.

The operation of the reference terminal and processing of measured data for the cases A, B, C is identical to method 1.

Although the reference SF indicator signal will indicate to the reference terminal which SF is intended to be the reference beam signal, SFs received at any position within a BSTP can be defected by the reference terminal. So, deviations from receiving SFs from the planned position can be used as indication, that the BSTP counter cycle in the satellite is not synchronized with the BSTP counter cycle of the modulator. The underlying principle here is that in split beam mode also all over SFs on the different coverages can be used as reference beam SF.

An extension of this signaling concept could be, to signalize from the modulator to the reference terminal during the last BSTP cycle with the old BSTP plan and the first BSTP cycle of the new BSTP plan, the old as well as the new reference beam position and let the reference terminal detect, at which reference counter value the reference beam has moved to the new position.

Figure 6C:
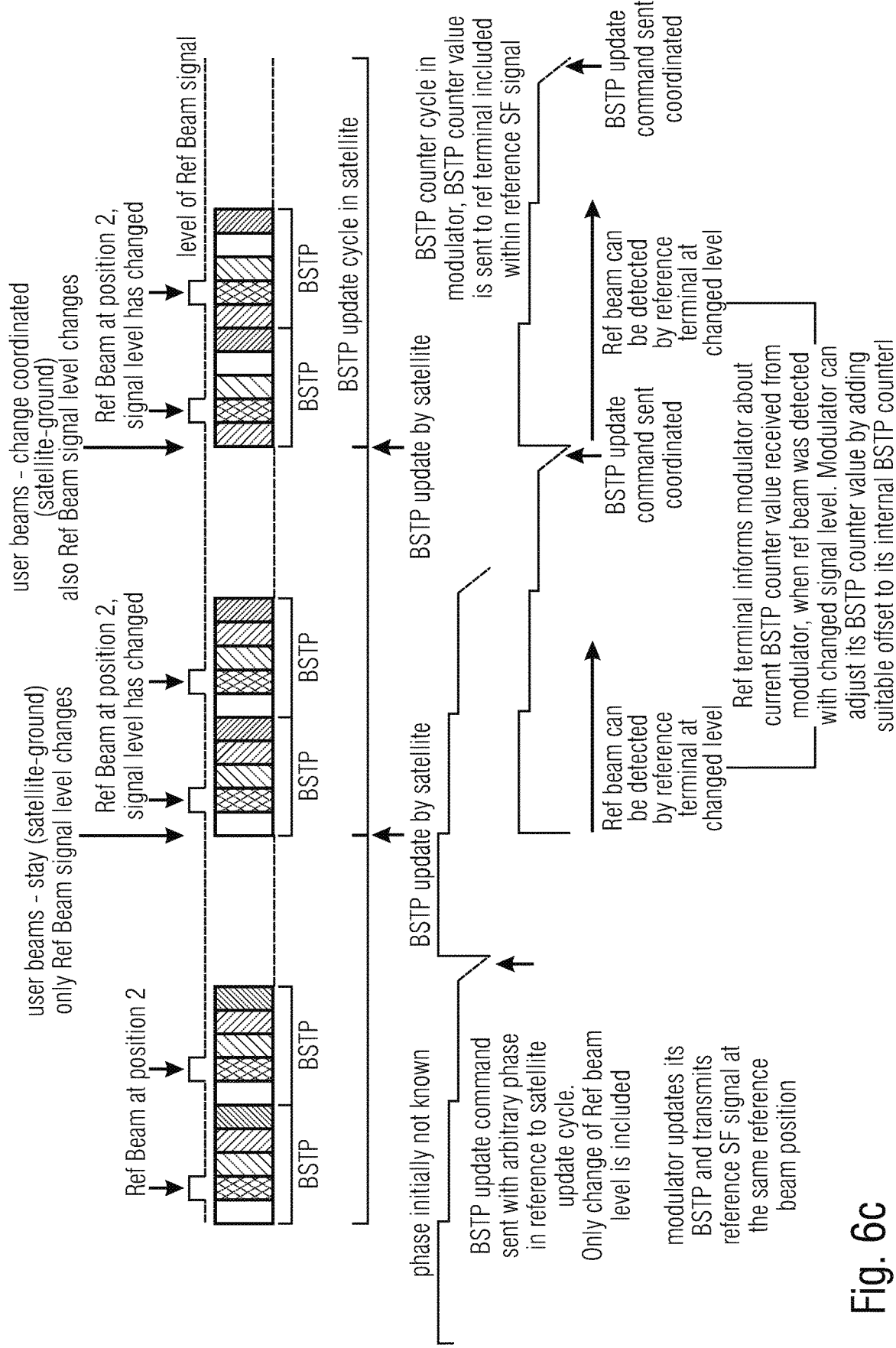

Method 3 is illustrated in FIG. 6c. No changes in time of the reference beam position is required, only level changes of the reference beam signal can be applied by programming the antenna patterns for the reference beam differently during different BSTP cycles. The terminal informs the modulator at which BSTP counter value a step change in power has occurred. The modulator can then adjust its own internal BSTP counter accordingly by applying this information as offset. If the detection of power step coincidences with the BSTP counter value equal zero of the modulator (before the step), the satellite and modulator BSTP counter are synchronized and no corrective action is required.

Method 2 with spilt beams as reference beam from different coverages and a frequent switchover shall be used to achieve and check synchronization.

According to a further embodiment the synchronization and tracking of the beam hopping of the satellite by the modulator on ground can be separated into two major levels:

Level1: Synchronization of the modulator to the BSTP in the satellite,

Level2: Synchronization of the modulator to the BSTP update cycle in the satellite, where to secure correct synchronization of the BSTP (Level 1) and to avoid any misinterpretation of e.g. signals from normal other beams (than the reference beam) leaking into the reference terminal area, regularly exercising Level 2 is advisable, to check for real satellite reaction on the reference beams. The satellite reactions in shifting the reference beam SF in time or changing the reference beam signal level in amplitude can be treated as a sync signal from the satellite, visible on ground.

An overall flow chart for network synchronization and continuous tracking is shown in FIG. 6d. The used reference terminal feedback values are noted. Details can be found in the chapters before.

FIG. 6d shows within an overview flowchart the advantageous variant of the synchronization procedure. This process is marked by the reference numeral 100', wherein the above discussed basic steps 110 and 140 performed at the ground stations are marked. For performing the step 140, the modulator transmits during the step 115 the reference super frame indicator signal including satellite trip delay which is received by the reference terminal (cf. step 135). When the known portion of the signal is received (cf. step 140) the time difference is analyzed during the step 150 (basic step), so that the trip delay and the super frame offset can be adapted during the step 160.

According to an embodiment, the method comprises the step 138 and 139, which enables to find the known portion in case same was not detected in the received time dwell.

Optionally, the method 100' comprises the steps 170, 180 and 190 which represent the synchronization procedure during normal operation as discussed above. During the step 170, a good detectable event 1 caused by the modulator, so that after that the event can be detected using the reference terminal (cf., step 180), in case, there is no synchronicity, the adaption of the offset/phase may be performed within step 190. Note, that advantageously all detection steps performed by the reference terminal are based on an additional information directly received from the modulator, namely regarding the transmission of the reference super frames or regarding an update of other transmission parameters, e.g., the beam spilt affiliation.

An Important feature of the "Synchronization Method with Reference Super Frame Indicator Signal" Is, that the synchronization check will be done continuously, and no changes in the waveform between normal operation and initialization phase are required. Possible hits to the system synchronicity for various reasons (e.g. downtime of a single system element, interruptions due rain outages, sun outages) can (after recovery) be detected arm corrected without the need to initiate a specific initialization mode. Also, no new signal elements need to be defined.

This allows operation of other terminals in the network as best as possible, which have no information about the operation of the control algorithm. The task of these terminals is just to catch up super-frames whenever they appear within their coverage.

Figure 7C:
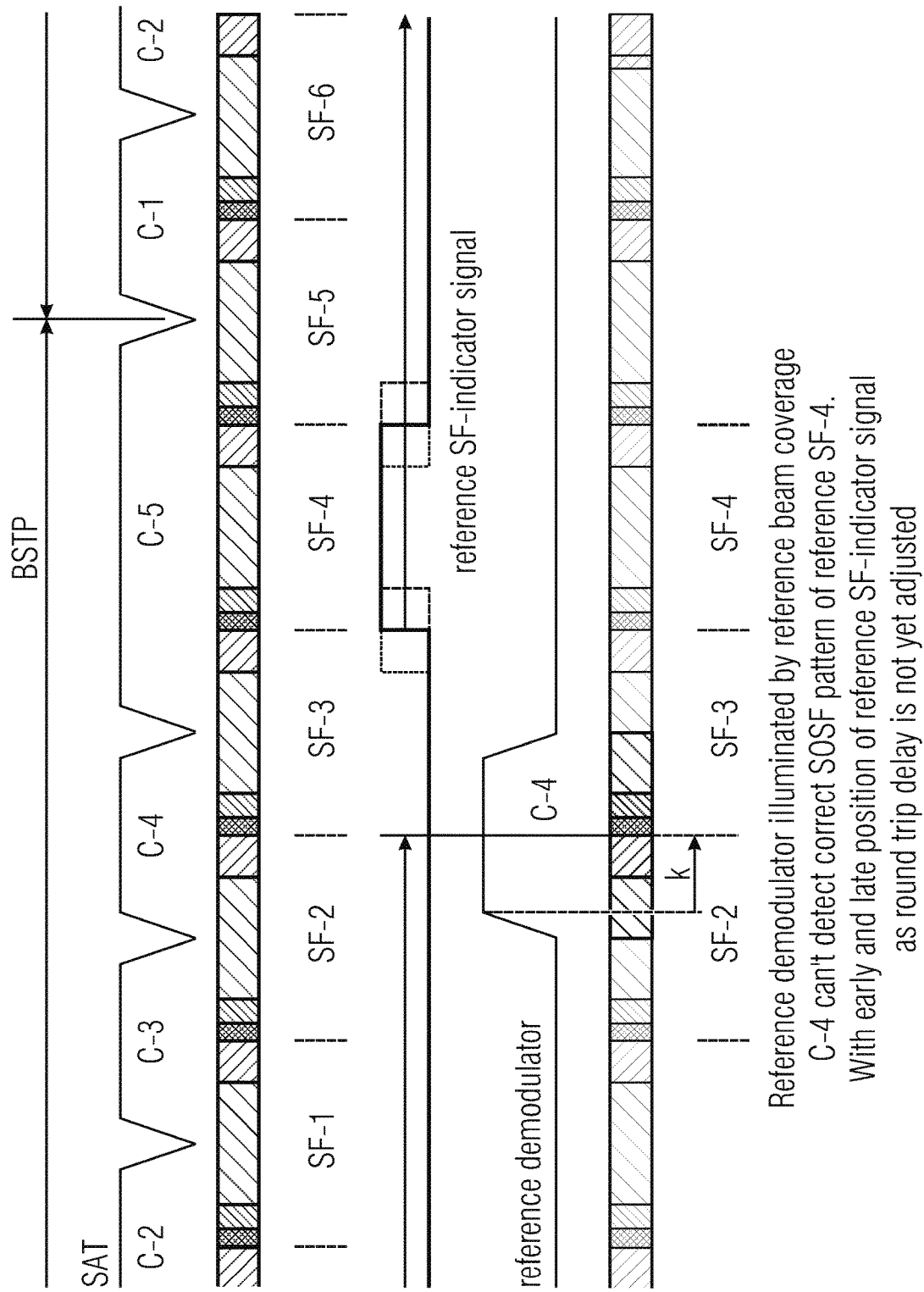
FIG. 7c, d, e Illustrates the synchronization procedure for a special embodiment.

Using another notification, the synchronization may be described as follows:

Case 1, BSTP not aligned as illustrated by FIG. 7c.

Assumption: Only one coverage (with reference beam) is visible for the reference terminal.

If any SOSF can be detected:

Measure time difference between rising edge of reference signal and start of first SOSF. This can be adjusted by an immediate update of the Ref Indicator signal delay in the modulator.

The regularity of the overall BSTP due to super frames of equal length may allow with a type of modulo calculation to adjust, with using some a priori knowledge about the nominal trip delay, to exactly the real trip delay, as long as the uncertainty about the real trip delay is less than the duration of a super frame.

Measure offset k between rising edge of power and start of first SOSF.

This can be adjusted in integer numbers of super frames or fine granular with temporary symbol rate modification (depending on offset).

Figure 7D:
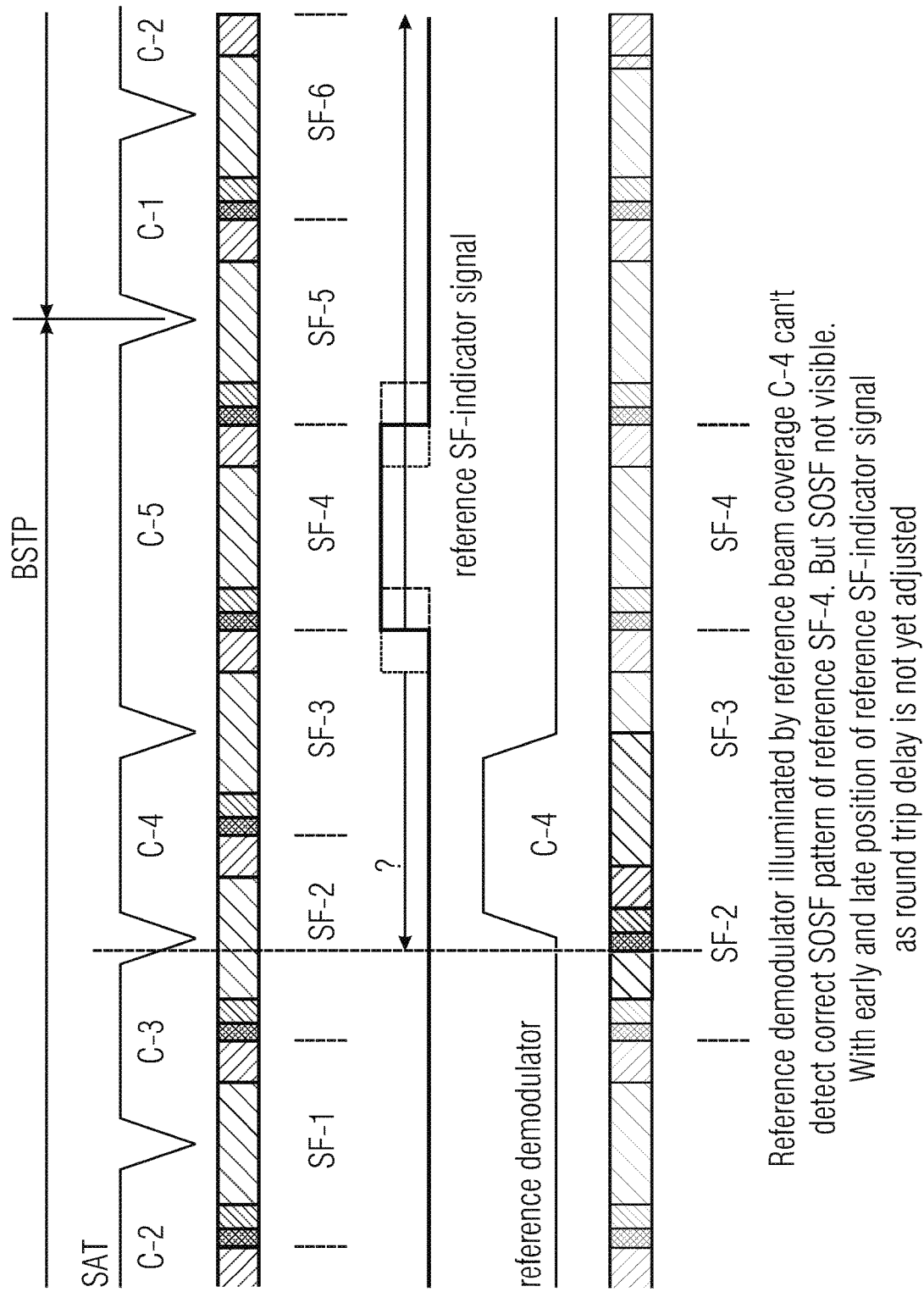
FIG. 7a illustrate network synchronization prerequisites for all required devices.
FIG. 7f illustrates influence of satellite movement on the control loop.
Figure 7E:
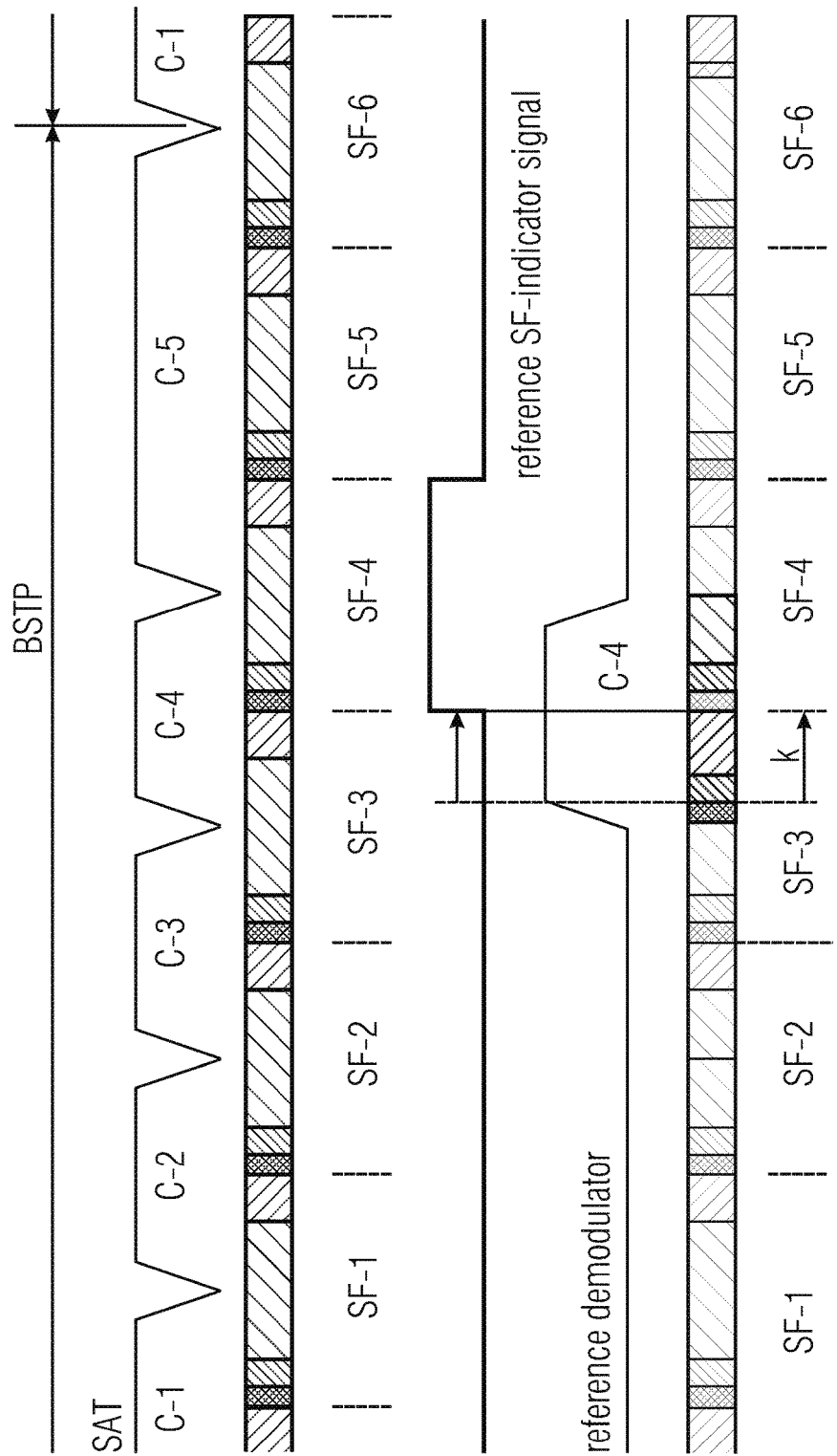

Continue with case 3 as shown in FIG. 7e.

Case 2, SOSF cannot be measured as illustrated by FIG. 7d.

In this case apply for a while some symbol rate offset until the SOSF becomes visible again. Then continue as in case 1 or case 3.

Case 3 shows the situation when the BSTP is at least coarsely as illustrated in FIG. 7e.

In this case only fine adjustment, need to applied, but the overall operation is similar to case 1.

Figure 7F:
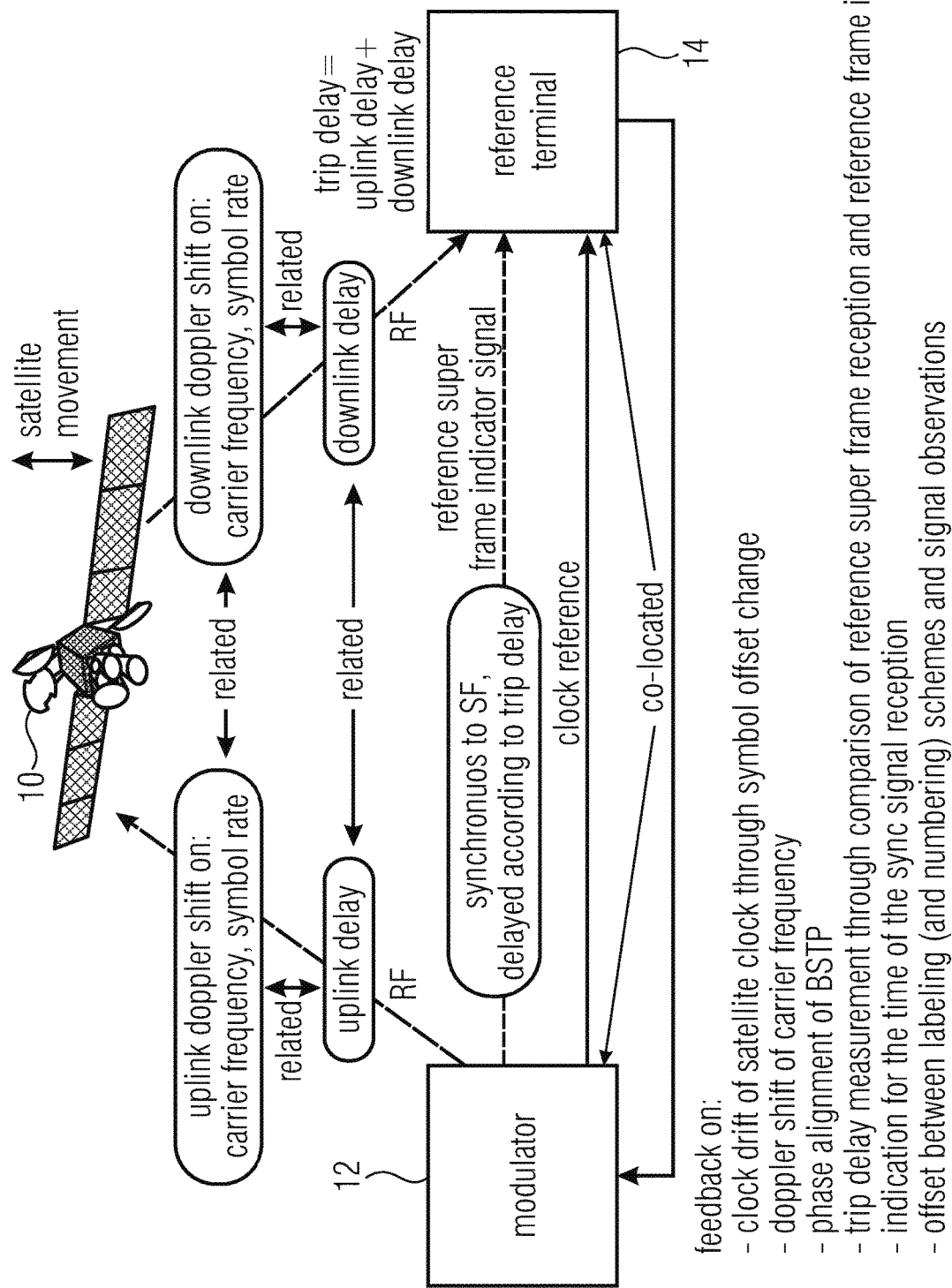

With regard to FIG. 7f, the influence of the satellite movement and especially the simulation of the satellite movement will be discussed.

As it has been already evaluated, satellite movement has an influence as disturbance variable on the control loop. This can be compensated by the control loop. Delay changes and doppler shift effects are closely related to each other through know physical formulas, so that doppler shift effect as observed on the carrier frequency can be used for an inner control loop for the delay adjustment. FIG. 7f shows which parameters are affected by satellite movement.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Definitions

Beam
A physical beam as available on the spacecraft.
Coverage
A temporal spatial utilization of a beam.
Dwell Time
Defined as the time the beam is intended to be on a given coverage. Note that it is the time interval between the earliest epoch when a given coverage is active to the earliest epoch when the next coverage is active. It therefore includes the transition time.
Beam Switching Time Plan (BSTP)
Defines coverage switching sequence from the gateway to user coverages on the TOWARD channel. The BSTP can be interpreted as the configuration data transmitted to the satellite via TM/TC link. And the Antenna Beam Switching Time Plan (ABSTP) corresponds to the antenna configuration data to implement the envisaged BSTP,
Loading Time
The time from sending of a telecommand from ground for a given functionality to the functionality being available (i.e. propagation delay pins transmission duration plus processing delay). This does not include the time for human intervention.
Synchronization Coverage
The coverage where the reference super-frame for synchronization is available.
Acquisition Phage
Defines the initial phase of network operation where the gateway (GW), the satellite, the reference terminal (RT), and the user terminals (UT) enter service from an undefined state of timing information. More specifically:
Network Acquisition Phase refers to network system start-up or restart. The GW aligns its transmit signal to the actual satellite BSTP by means of feedback from the RT,
the UT will try to demodulate SFs to their best possibility, even during still non synchronized network situations, as they anyway need to be designed robustly enough to demodulate and forward data only consistently, even if there are interruptions and distortions on the satellite signal, as it can happen also normally in rare situations.
Tracking Phase
Defines the operational phase where the gateway (GW), the satellite and the reference terminals (RT) have gone through the acquisition phase and thus share the common timing information, while maintaining synchronization to a common timing structure. More specifically:
Network Tracking Phase means fine-adjustment and control of the network system, wherefore the GW exploits feedback from the RT. In this phase, updates to the BSTP can be calculated by the GW and forwarded to the satellite operator for re-configuration.
Full tracking is possible in between the GW and the RT, but the BSTP pattern applied by the satellite should be at least known to the Gateway. More flexible in terms of operation would be to have the possibility to change the BSTP within the satellite from the gateway by tbd means.
Terminal Tracking Phase means lock to the network system (following also updated BSTP) as well as fine-adjustment and control of synchronization parameters. The UT will try to demodulate SFs to their best possibility, even during still non optimally synchronized network situations, as they anyway need to be designed robustly enough to demodulate and forward data only consistently, even if there are interruptions and distortions on the satellite signal, as it can happen also normally in rare situations,
Super Frame
Super frame is a term mainly used in connection with the DVB-S2x standard, wherein super frame should be understood as data frame having at least a header and a payload.
Trip Delay
The trip delay refers to the time period during which an (uplink) signal travels from the modulator via the satellite to the respective terminal.

Acronyms and Abbreviations

ACM Adaptive Coding and Modulation
A/D Analogue-to-digital (converter)
APSK Amplitude Phase Shift Keying
ALC Automatic Level Control
AM Amplitude Modulation
ASI Asynchronous serial interface
ATS Antenna Tracking System
BB Base-Band
BER Bit Error Rate
BH Beam Hopping
BPSK Binary Phase Shift Keying
BSTP Beam Switching Time Plan
BW Bandwidth
C/I Carrier-to-Interference Ratio
DTH Direct-to-Home
DVB-S2 Digital Video Broadcasting—Satellite, version 2
DVB-S2X DVB-S2 Extensions
EIRP Equivalent isotropically Radiated Power
Es/N0 Symbol Energy-to-Noise Density Ratio (normalized SNR)
ETSI European Telecommunication Standard institute
FDMA Frequency Division Multiple Access
FEC Forward Error Correction
FPGA Field Programmable Gate Array
G/T Gain-to-Noise Temperature Ratio
GW Gateway
HPA High Power Amplifier
IBO Input Back-Off
IF Intermediate Frequency
IMUX input Multiplexer
I/Q In-phase/Quadrature
IP(R) Intellectual Property (Right)
LHC(P) Left Hand Circular (Polarised/Polarisation)
LNA Low Noise Amplifier
LOS Line Of Sight
LP Linearly Polarised
MODCOD Modulation and Coding
OBO Output Back-Off
ODU Out-Door Unit
OMUX Output Multiplexer
PER Packet Error Ratio
PHY Physical Layer
PL(H) Physical Layer (Header)
PR(BS) Pseudo-Random (Bit Sequence)
(Q)PSK (Quaternary) Phase Shift Keying
REQ Requirement
RF Radio Frequency
RHC(P) Right Hand Circular (Polarised/Polarisation)
RT Reference Terminal
RTN Return (Link)

Rx Receiver/Receiving
SF Super-Frame
SFFI Super-Frame Format Indicator
SNR Signal-to-Noise Ratio
SOSF Start Of Super-Frame
TBC To Be Confirmed
TBD To Be Defined
TOMA Time Division Multiple Access
TM Telemetry
TWT(A) Travelling Wave Tube (Amplifier)
Tx Transmitter/Transmitting
UT User Terminal

REFERENCES

[1] ESA Invitation-to-Tender, Letter of invitation: "Beam hopping emulator for satellite systems", Aries 5.1, Activity Reference 3A.072: AO8265-ll00pe.pdf
[2] ESA Invitation-to-Tender. Statement of Work: "Beam hopping emulator for satellite systems", Artes 5.1, Activity Reference 3A.072: AO8285-ws00pe.pdf
[3] ESA Invitation-to-Tender. Contract: "Beam hopping emulator tor satellite systems", Artes 5.1, Activity Reference 3A.072: AO8285cc00pe.pdf
[4] ESA Invitation-to-Tender, Special Conditions of Tender: "Beam hopping emulator for satellite systems", Artes 5.1, Activity Reference 3A.072: AO3265-tc00pe.pdf
[5] ETSI EN 302 307-1, v1.4.1 (2014-11), "Digital Video Broadcasting (DVB): Second generation framing structure, channel coding and modulation systems for Broadcasting, Interactive Services, News Gathering and other broadband satellite applications; Part 1: DVB-S2
[6] ETSI EN 302 307-2, v1.1.1 (2014-10), "Digital Video Broadcasting (DVB); Second generation framing structure, channel coding and modulation systems for Broadcasting, Interactive Services, News Gathering and other broadband satellite applications: Part 2: DVB-S2 Extensions (DVB-S2X)
[7] DVB-S2 user guidelines: ETSI TR 102 376, V1.1.1 (2005-02): Digital Video Broadcasting (DVB); User guidelines for the second generation system for Broadcasting, Interactive Services, News Gathering and other broadband satellite applications (DVB-S2)
[8] Draft ETSI TR 102 378-2 V1.1.1 (2014-xx), User guidelines for the second generation system for Broadcasting, Interactive Services News Gathering and other broadband satellite applications: Part 2: S2 extensions (DVB-S2X)
[9] Fraunhofer I I S, Fraunhofer H H I, WORK Microwave, Newtec, D L R, IZT GmbH "Direct to Home System Demonstrator for High Throughput Multimedia Applications", ESA research project, contract number 4000103596/11/NL/AD
[10] Fraunhofer I I S, WORK Microwave, Avanti Communications: Ultra-High Throughput Transmission Through Wideband Ka Transponder, ESA research project, contract number 4000110170/14/NL/EM
[11] C. Rohde, H. Stadali, J. Perez-Trufero, S, Watts, N, Aiagha, and R, De Gaudenzi, "Implementation of DVB-S2X Super-Frame Format 4 for Wideband Transmission," 7th EAI international Conference on Wireless and Satellite Systems (WISATS), July 2015, Bradford, United Kingdom
[12] Digital Video Broadcasting (DVB), White Paper on the use of DVB-S2X for DTH applications, DSNG & Professional Services, Broadband Interactive Services and VL-SNR applications. DVB Document A172 (2015)
[13] C. Rohde, M Alagha, R. De Gaudenzi, H. Stadali, G. Mocker, "Super-Framing: A Powerful Physical Layer Frame Structure for Next Generation Satellite Broadband Systems," ini Journal of Satellite Communications and Networking (IJSCN), Wiley Press, vol. 34, no. 3, pp. 413-438, November 2015, sAT-15-0037.R1. Available: http://dx.doi.org/10.1002/sat.1153
[14] European Space Agency, "Wide-band Direct to Home (WIDiHo)" Information available at: http://artes.esa.int/projects/wideband-direct-home-widiho-itt6613

The invention claimed is:

1. A method for synchronizing a plurality of super frames to a beam switching time plan defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam; wherein each super frame comprises a data frame to be forwarded by the satellite to the respective service area;

the method comprises:

transmitting at least one of the plurality of super frames to the satellite as reference super frame, using a modulator;

applying the beam switching time plan and forwarding—using the satellite—the reference super frame to a reference terminal within one of the plurality of dwell times;

receiving, using the reference terminal, the one of the plurality of dwell times;

determining a known sequence of the reference super frame within the one of the plurality of dwell times; and determining a time difference between transmitting the reference super frame and receiving the one of the dwell times or receiving of the reference super frame or determining a time period being directly dependent on the time difference between transmitting the reference super frame and receiving the one of the dwell times or receiving of the reference super frame;

wherein the method further comprises adapting the transmission of the plurality of super frames with regard to a point of time of the transmission based on the determined time difference in order to synchronize the plurality of super frames to the beam switching plan; or wherein the method further comprises adapting the transmission of the plurality of super frames with regard to a point of time of the transmission based on the determined time difference by shifting the transmission by a number of super frames and adapting a trip delay by an determined offset, wherein the number is defined by integer multiples of a fix super frame length within the time difference and wherein the offset is calculated using the subtraction of the integer multiples from the determined time difference; and/or wherein the method further comprises adapting the beam switching time plan based on the determined time difference in order to synchronize the plurality of super frames to the beam switching plan; or wherein the method further comprises transmitting a reference super frame indicator signal to the reference terminal, wherein the reference super frame indicator signal indicates a transmission begin, a transmission window and/or a transmission end of the reference super frame;

wherein determining the time difference is performed so as to determine the time difference between the receipt of the one of the dwell times or of the known sequence of the reference super frame and the super frame indicator signal.

2. The method according to claim 1, wherein the transmission of the at least one of the plurality of super frames is performed using a trip delay for delaying the transmission the plurality of super frames with respect to the beam switching time plan; and wherein the method further comprises adapting the trip delay based on the determined time difference in order to synchronize the plurality of super frames to the beam switching plan; or wherein the transmission of the at least one of the plurality of super frames is performed using a trip delay for delaying the transmission the plurality of super frames with respect to the beam switching time plan; and wherein the method further comprises transmitting a reference super frame indicator signal to the reference terminal, the reference super frame indicator indicating a the trip delay, and comparing the received reference super frame indicator signal with the received receipt of the one of the dwell times or of the reference super frame so as to determine the time difference; and wherein the method further comprises adapting the trip delay based on the determined time difference in order to synchronize the plurality of super frames to the beam switching plan.

3. The method according to claim 1, wherein the method further comprises adapting transmission parameters, adapting a symbol clock frequency, adapting phase and/or skipping symbols of a super frame or skipping super frames in order to adapt or delay the transmission.

4. The method according to claim 1, wherein the method is initially performed during a calibration phase before using the satellite in a normal operation phase.

5. The method according to claim 1, wherein the adapting is performed taking a trip delay into consideration which is calculated using a modulo calculation of the time difference; and/or wherein the adapting comprises preforming modulo calculation on a duration of the super frames to determine how many super frames by use of the beam switching time plan has to be shifted by the modulator.

6. The method according to claim 1, wherein the method comprises updating the beam switching time plan and, wherein transmitting is performed for a further one of the plurality of super frames as further reference super frame;

wherein receiving is performed for a further of the plurality of dwell times; and wherein determining the known sequence of is performed for the further reference super frame within the further one of the plurality of dwell times; and wherein determining the time difference is performed for a time difference between receiving the further one of the dwell times or receiving the further reference super frame and transmitting the further reference super frame.

7. The method according to claim 1, wherein the method comprises causing a detectable transmission event using the modulator;

wherein receiving is performed for a further of the plurality of dwell times being influenced by the detectable transmission event; and wherein determining the time difference is performed by determining a time difference between receiving the detectable transmission event and receiving corresponding known sequence of super frame as reference super frame.

8. The method according to claim 7, wherein the detectable transmission event is an update of a split beam affiliation; and/or wherein the detectable transmission event is an update of a split beam affiliation to define another beam from which beam assigned to a respective service area a reference beam to the reference terminal is spitted.

9. The method according to claim 1, wherein the method comprises transmitting a reference signal indicating an expected receipt, an expected receipt begin, an expected receipt window and/or an expected receipt end of the one of the dwell times to the reference terminal; and wherein the method further comprises determining an updated time difference between the receipt and the expected receipt; and wherein the method further comprises adapting the transmission of the plurality of super frames or of the beam switching time plan based on the updated time difference.

10. The method according to claim 1, wherein the method further comprises varying a parameter for the transmission of the reference super frame in order to verify the synchronicity or in order to mark a further one of the dwell times as dwell time for forwarding a further reference super frame.

11. The method according to claim 1, wherein the steps are iteratively performed during an operation phase in order to maintain the synchronicity between the plurality of super frames and the beam switching time plan.

12. The method according to claim 1, wherein determining the known sequence is performed by shifting the transmission of a further one of the plurality of super frames as further reference super frame by a fragment of the super frame period or a half of the super frame period in order to enable to determine the known sequence of reference super frame.

13. The method according to claim 1, wherein the reference super frame and/or the reference super frame indicator signal comprises an identification information on the coverage area, and wherein determining the known sequence of the reference super frame comprises the verification of the matching of the identification information regarding the coverage area between the transmitted and the received reference super frame which provide equal identification information; and/or wherein the method comprises counting the number of determined reference super frames; and/or wherein the method comprises determining a time difference between the know sequence and the begin of the dwell time to verify the synchronicity; and/or wherein the method comprises resetting a counter when detecting reference signal and incrementing the counter with each super frame; and/or wherein the method comprises analyzing a BSTP counter value signaled over the reference super frame indicator signal so as to determine a time offset as full BSTPs between the satellite update cycle and modulator update cycle; and/or wherein information carried by the reference super frame indicator signal is encoded or protected or comprises a redundancy information.

14. The method according to claim 1, wherein the method comprises determining a change rate of the time difference, by comparing at least two determined time differences; or wherein the method comprises determining a change rate of the time difference, by comparing at least two determined time differences and updating a trip delay based on the change rate;

wherein the method comprises measuring frequency offset values corresponding to the doppler shift of a symbol rate or carrier frequency of the received reference super frame; or wherein the method comprises measuring frequency offset values corresponding to the doppler shift of a symbol rate or carrier frequency of the received reference super frame and correcting a symbol clock rate of the modulator based on the measured frequency offset; or wherein the method comprises determining a change rate of the time difference, by comparing at least two determined time differences and storing the change rate in a look-up table.

15. The method according to claim 1, wherein the method comprises forecasting a change rate of the time difference using predetermine data; or wherein the method comprises forecasting a change rate of the time difference using predetermined data and updating a trip delay based on the change rate.

16. The method according to claim 1, wherein the method performs transmitting initially by using a predetermined trip delay in order to minimize the difference between the expected receipt of the one of the dwell times or the receipt of the reference super frame and a transmission of the reference super frame.

17. The method according to claim 1, wherein a regular super frame is used as reference super frame; or wherein a regular super frame is used as reference super frame and marked as reference super frame using identification information regarding the coverage area, said information is transmitted to the reference terminal.

18. The method according to claim 1, wherein the method comprises adapting a beam forming configuration defining an association of beams and service areas or an affiliation configuration signal defining from which beam assigned to a respective service area a reference beam to the reference terminal is spitted to enable the generation of a split beam used to forward the reference super frame to the reference terminal or to enable to generate a dedicated beam used to forward the reference super frame to the reference terminal.

19. The method according to claim 1, wherein the reference super frame and/or the reference super-frame indicator signal comprises feedback data message or an information for generating the feedback data message.

20. The method according to claim 1, wherein each of the plurality of super frames comprises a regular length or a same length or a different length but being a multiple of a baseline super frame length or wherein each of the plurality of super frames transmitted using the same beam switching time plan comprises the same length or different length but being a multiple of a baseline super frame length.

21. The method according to claim 1, wherein the adapting is performed so as to correct an trip delay offset and BSTP delay in reference to the illumination window or dwell time by one step; and/or wherein the adapting is performed so as to correct trip delay based on measured trip delay correction values and to adapt the BSTP transmission delay based on known physical similarities;

wherein the adapting is performed so as to correct the BSTP delay using measured BSTP delay correction values and to adapt the trip delay based on known physical similarities.

22. A non-transitory digital storage medium having a computer program stored thereon to perform the method for synchronizing a plurality of super frames to a beam switching time plan defining a plurality of dwell times, the beam switching time plan scheduling a switching between at least two beams which are transmitted using a high-altitude platform or a satellite, wherein each beam covers a respective service area so as to forward a respective data frame to the respective service area via the respective beam; wherein each super frame comprises a data frame to be forwarded by the satellite to the respective service area;

the method comprises:

transmitting at least one of the plurality of super frames to the satellite as reference super frame, using a modulator;

applying the beam switching time plan and forwarding—using the satellite—the reference super frame to a reference terminal within one of the plurality of dwell times;

receiving, using the reference terminal, the one of the plurality of dwell times;

determining a known sequence of the reference super frame within the one of the plurality of dwell times; and determining a time difference between transmitting the reference super frame and receiving the one of the dwell times or receiving of the reference super frame or determining a time period being directly dependent on the time difference between transmitting the reference super frame and receiving the one of the dwell times or receiving of the reference super frame, wherein the method further comprises adapting the transmission of the plurality of super frames with regard to a point of time of the transmission based on the determined time difference in order to synchronize the plurality of super frames to the beam switching plan; or wherein the method further comprises adapting the transmission of the plurality of super frames with regard to a point of time of the transmission based on the determined time difference by shifting the transmission by a number of super frames and adapting a trip delay by an determined offset, wherein the number is defined by integer multiples of a fix super frame length within the time difference and wherein the offset is calculated using the subtraction of the integer multiples from the determined time difference; and/or wherein the method further comprises adapting the beam switching time plan based on the determined time difference in order to synchronize the plurality of super frames to the beam switching plan; or wherein the method further comprises transmitting a reference super frame indicator signal to the reference terminal, wherein the reference super frame indicator signal indicates a transmission begin, a transmission window and/or a transmission end of the reference super frame; wherein determining the time difference is performed so as to determine the time difference between the receipt of the one of the dwell times or of the known sequence of the reference super frame and the super frame indicator signal, when said computer program is run by a computer.

23. A controller for synchronizing a plurality of super frames to a beam switching time plan defining plurality of dwell times, the beam switching time plan scheduling a switching between at least two beams which are transmitted using a high-altitude platform or a satellite, wherein each beam covers a respective service area so as to forward a respective data frame to the respective service area using the respective beam; wherein each super frame comprises a data frame to be forwarded to the satellite to a respective service area, wherein the controller is configured:

to control a modulator such that same transmits at least one of the plurality of super frames to the satellite as reference super frame and to apply the beam switching time plan to the satellite such that the satellite forwards the reference super frame to the reference terminal within one of the plurality of dwell times to a reference terminal; and to control the reference terminal such that same receives the one of the plurality of dwell times and determines a known sequence of the reference super frame within the one of the plurality of dwell times; and to determine a time difference between receiving the one of the dwell times or receiving the reference super frame and transmitting of the reference super frame or to determine a time period being directly dependent on the time difference between transmitting the reference super frame and receiving the one of the dwell times or receiving of the reference super frame;

wherein the controller is configured for adapting the transmission of the plurality of super frames with regard to a point of time of the transmission based on the determined time difference in order to synchronize the plurality of super frames to the beam switching plan; or wherein the method further comprises adapting the transmission of the plurality of super frames with regard to a point of time of the transmission based on the determined time difference by shifting the transmission by a number of super frames and adapting a trip delay by an determined offset, wherein the number is defined by integer multiples of a fix super frame length within the time difference and wherein the offset is calculated using the subtraction of the integer multiples from the determined time difference; and/or wherein the method further comprises adapting the beam switching time plan based on the determined time difference in order to synchronize the plurality of super frames to the beam switching plan; or wherein the controller is configured for transmitting a reference super frame indicator signal to the reference terminal, wherein the reference super frame indicator signal indicates a transmission begin, a transmission window and/or a transmission end of the reference super frame; wherein determining the time difference is performed so as to determine the time difference between the receipt of the one of the dwell times or of the known sequence of the reference super frame and the super frame indicator signal.

24. The controller according to claim 23, wherein the controller is integrated into the reference terminal.

25. The controller according to claim 23, wherein the controller is integrated into the modulator.

26. The controller according to claim 23, wherein the controller is configured to control a plurality of modulators.

27. The controller according to claim 23, wherein the controller is configured to update the beam switching time plan.

28. The controller according to claim 23, wherein the controller is configured to analyze traffic demands for the respective service areas and to adapt the beam switching time plan based on the analysis.

29. A system comprising a controller according to claim 23, a modulator and a reference terminal.

30. The system according to claim 29, further comprising a beam switching satellite or beam switching high altitude platform.

31. The system according to claim 29, wherein the modulator and the reference terminal are driven by a common clock and/or are connected to each other by a control line and/or positioned next to each other and/or at spaced apparat from each other.

* * * * *

UNITED STATES PATENT AND TRADEMARK OFFICE
CERTIFICATE OF CORRECTION

| | |
|---|---|
| PATENT NO. | : 11,817,938 B2 |
| APPLICATION NO. | : 17/181306 |
| DATED | : November 14, 2023 |
| INVENTOR(S) | : Christian Rohde et al. |

It is certified that error appears in the above-identified patent and that said Letters Patent is hereby corrected as shown below:

In the Claims

In Claim 31, Column 44, Line 39, delete "apparat" and insert therefor --apart--

Signed and Sealed this
Nineteenth Day of March, 2024

*Katherine Kelly Vidal*
Katherine Kelly Vidal
*Director of the United States Patent and Trademark Office*